United States Patent [19]

Nohara et al.

[11] Patent Number: 5,485,749
[45] Date of Patent: Jan. 23, 1996

[54] ACCELERATION DETECTOR

[75] Inventors: Kazuya Nohara; Naohiro Taniguchi, both of Hirakata, Japan

[73] Assignee: Matsushita Electric Works, Ltd., Osaka, Japan

[21] Appl. No.: 245,695

[22] Filed: May 18, 1994

[30] Foreign Application Priority Data

May 26, 1993 [JP] Japan .................................. 5-124361

[51] Int. Cl.$^6$ .................................................. G01P 21/00
[52] U.S. Cl. .................................. 73/517.34; 338/2
[58] Field of Search ........................... 73/517 R, 517 B, 73/517 AV; 338/2, 3, 5, 47

[56] References Cited

U.S. PATENT DOCUMENTS

| | | | |
|---|---|---|---|
| 4,967,605 | 11/1990 | Okada | 73/517 B |
| 5,060,504 | 10/1991 | White et al. | 73/517 R |
| 5,081,867 | 1/1992 | Yamada | 73/517 R |
| 5,121,180 | 6/1992 | Beringhause et al. | 73/517 R |
| 5,233,213 | 8/1993 | Marek | 73/517 R |
| 5,295,386 | 3/1994 | Okada | 73/517 R |

FOREIGN PATENT DOCUMENTS

| | | | |
|---|---|---|---|
| 0461265 | 12/1991 | European Pat. Off. | |
| 3-214064 | 1/1990 | Japan | 73/517 R |
| 1300118 | 12/1972 | United Kingdom | |

Primary Examiner—Hezron E. Williams
Assistant Examiner—Helen C. Kwok
Attorney, Agent, or Firm—Stevens, Davis, Miller & Mosher

[57] ABSTRACT

In an acceleration detector for detecting three-dimensional components of acceleration applied thereto independently with respect to three axes X, Y and Z of an orthogonal coordinate system, a plurality of resistance elements having a piezo resistance effect are formed in a thin-sheet resilient member with an unique arrangement thereof for improving the sensitivity of the detector. Electric resistance of the resistance elements is varied in response to strain of the resistance elements accompanied with an elastic deformation of the resilient member. The resilient member is fixed at its periphery on a frame of the detector. A weight is connected with a center portion of the resilient member such that the elastic deformation is caused when the weight is displaced by receiving acceleration. When the X- and Y-axes is defined on the resilient member, all of resistance elements for detecting the components of acceleration with respect to the X- and Y-axes are limited within an inner area adjacent to a circumference of the center portion. The inner area is capable of causing a larger elastic deformation than an outer area adjacent to the frame when the weight is displaced by receiving the acceleration. Therefore, an improved sensitivity of the detector is accomplished by the arrangement of the resistance elements.

14 Claims, 14 Drawing Sheets

ACCELERATION DETECTOR

BACKGROUND OF THE INVENTION

1. Field of the Invention

The present invention relates to an acceleration detector which adopts an unique arrangement of resistance elements having a piezo resistance effect for improving the sensitivity thereof.

2. Description of the Prior Art

As an acceleration detector for detecting acceleration applied thereto, diaphragm- and beam-type acceleration detectors are known. For example, as shown in FIGS. 21 and 22, a diaphragm-type acceleration detector 1C comprises a frame 10C defining an open space therein and having a top face 11C and bottom face 12C, a bottom cover 20C, a thin-sheet resilient member 30C, and a weight 40C. The resilient member 30C is jointed at its periphery to the top face 11C of the frame 10C. The weight 40C is hung down from a center of the resilient member 30C through a neck portion 41C. The neck portion 41C is fixed with a center portion 31C of the resilient member 30C in such a manner as to cause an elastic deformation of the resilient member when the weight 40C is displaced with respect to the frame 10C by receiving an acceleration. These parts of the acceleration detector 1C are made of a semi-conductor material. Resistance elements R having a piezo resistance effect are formed in the resilient member 30C to detect three components of acceleration applied to the detector 1C with respect to X-, Y- and Z- axes of an orthogonal coordinate system in such a manner that electric resistance of the resistance elements R is varied in response to strain of the resistance elements accompanied with the elastic deformation of the resilient member. The acceleration is determined in accordance with a variation of the electric resistance by an acceleration determining section. The bottom cover 20C is useful as a stopper for preventing a breakage of the resilient member 30C when receiving an excess acceleration. Numeral "62" designates a bonding pad for wiring a conductor pattern.

U.S. Pat. No. 4,967,605 discloses an arrangement of resistance elements R for a diaphragm-type acceleration detector, as shown in FIG. 24. The resistance elements R consisting of a first set of four resistance elements RX1–RX4 for detecting a first component of acceleration with respect to the X-axis, a second set of four resistance elements RY1–RY4 for detecting a second component of acceleration with respect to the Y-axis, and a third set of four resistance elements RZ1–RZ4 for detecting a third component of acceleration with respect to the Z-axis. When X- and Y-axes are set on a plane of a thin-sheet resilient member of the detector, the resistance elements RX1–RX4 of the first set are aligned on the X-axis, and assembled as a first bridge circuit, as shown in FIG. 25A. The resistance elements RY1–RY4 of the second set are aligned on the Y-axis, and assembled as a second bridge circuit, as shown in FIG. 25B. In addition, the resistance elements RZ1–RZ4 of the third set are aligned parallel to the X-axis, and assembled as a third bridge circuit as shown in FIG. 25C. When a predetermined voltage or current is delivered from a power source to each bridge circuit, the respective bridge voltages are measured by voltage meters Vx, Vy and Vz. Therefore, the three components of acceleration can be detected independently with respect to the X-, Y- and Z-axes.

On the other hand, a beam-type acceleration detector 1D is the substantially same structure as the diaphragm-type acceleration detector except that a resilient member 30D is formed with four rectangular holes 32D around a center portion 31D thereof so as to be shaped into a cross beam configuration, as shown in FIG. 23. In case that the beam-type acceleration detector 1D adopts the same arrangement of the resistance elements of FIG. 24, stresses received the resistance elements when acceleration is applied to a weight 40D of the detector are analyzed as below. That is, when no acceleration is applied to the detector, stress is not applied to the resistance elements, as shown in FIG. 26A. For example, when acceleration F1 is applied to the detector upwardly in the Z-axis direction, as shown in FIG. 26B, each of the resistant elements RX1, RX4, RY1, RY4, RZ1, and RZ4 receives a compressive stress $\sigma 1$ which is indicated by minus sign in FIG. 26C. Each of the resistance elements RX2, RX3, RY2, RY3, RZ2 and RZ3 receives a tensile stress $\sigma 2$ which is indicated by plus sign in FIG. 26C. The tensile stress $\sigma 2$ is equal to the absolute value of the compressive stress $\sigma 1$. Therefore, when acceleration is applied to the detector in the Z axis direction, a sensitivity of the acceleration detector is not dominated by the arrangement of the resistance elements.

However, when acceleration F2 is applied to the detector in the X-axis direction, as shown in FIG. 26D, each of the resistant elements RX1 and RZ1 receives a tensile stress $\sigma 3$, and each of the resistance elements RX3 and RZ3 receives a tensile stress $\sigma 4$ which is twice as large as the stress $\sigma 3$. On the contrary, each of the resistance elements RX4 and RZ4 receives a compressive stress $\sigma 6$, and each of the resistance elements RX3 and RZ3 receives a compressive stress $\sigma 5$ which is twice as large as the stress $\sigma 6$. These compressive stresses are indicated by minus sign in FIG. 26E. The tensile stresses $\sigma 3$ and $\sigma 4$ are respectively equal to the absolute values of the compressive stresses $\sigma 6$ and $\sigma 5$. In this case, no stress is applied to the resistance elements RY1 to RY4. Though the above analysis is performed with respect to the acceleration having the X-axis direction thereof, the similar results of stress analysis are obtained with respect to acceleration having the Y-axis direction thereof. Consequently, the absolute value of stress received by the resistance element adjacent to a frame 10D of the detector is equal to a half of that of stress received the resistance element adjacent to the center portion 31D of the resilient member 30D. This fact indicates that the arrangement of the resistance elements of the prior art results in a low sensitivity of the acceleration detector when acceleration is applied to the detector in the X- or Y-axis direction. The above stress analysis is performed with respect to the beam-type acceleration detector 1D because a stress analysis of the diaphragm-type acceleration detector 1C is very complex. However, there is the same problem as to the beam-type acceleration detector with respect to the diaphragm-type acceleration detector.

SUMMARY OF THE INVENTION

For improving the above problem, the present invention is directed to an acceleration detector for sensitively detecting three-dimensional components of acceleration applied thereto independently with respect to X-, Y- and Z-axes of an orthogonal coordinate system. The acceleration detector comprises a frame defining an open space therein and having a top face and a bottom face, a thin-sheet resilient member extended over the open space and integrally joining at its periphery to the top face of the frame, a weight depended from a center of the resilient member through a neck portion, a plurality of resistance elements having a piezo resistance effect formed in the resilient member. These parts of the acceleration detector are integrally made of a semi-conductor material. The X- and Y-axes are defined to extend in the general plane of the resilient member. The neck portion is fixed with a center portion of the resilient member in such a manner as to cause an elastic deformation of the resilient member when the weight is displaced with respect to the frame by receiving the acceleration. Electric resistance of the resistance elements is varied in response to strain of the resistance elements accompanied with the elastic deformation of the resilient member. The resistance elements consist of a first set of four resistance elements for detecting a first component of the acceleration with respect to the X-axis, a second set of four resistance elements for detecting a second component of the acceleration with respect to the Y-axis, and a third set of four resistance elements for detecting a third component of the acceleration with respect to the Z-axis. All of the resistance elements of the first and second sets are limited within an inner area of the resilient member independently adjacent to a circumference of the center portion. The inner area is capable of causing a larger elastic deformation than an outer area of the resilient member adjacent to the frame when the weight is displaced by receiving the acceleration. Consequently, the acceleration is determined by an acceleration determining section of the acceleration detector in accordance with a variation of electric resistance of the resistance elements.

Therefore, it is a primary object of the present invention is to provide an acceleration detector which adopts an unique arrangement of resistance elements having a piezo resistance effect for sensitively detecting three-dimensional components of acceleration applied thereto independently with respect to X-, Y- and Z-axes of an orthogonal coordinate system.

In a preferred embodiment of the present invention, the resistance elements of the third set are formed in the resilient member such that two resistance elements are arranged at opposite positions of the outer area on the X-axis and the other two resistance elements are arranged at opposite positions of the outer area on the Y-axis.

It is further preferred that the four resistance elements of the third set are aligned on one of the X- and Y-axes.

It is still further preferred that the four resistance elements of the third set are also arranged within the inner area.

In another preferred embodiment, the acceleration detector includes the following structural features for effecting as a beam-type acceleration detector. That is, the resilient member is formed with four rectangular holes around the center portion so as to be shaped into a cross beam configuration. An upper cover is fixed on the top face of the frame in a spaced relation to the resilient member. The weight is formed integrally with four projections which project respectively into the rectangular holes in such a manner that a top face of each projection is flush with the top surface of the resilient member. A corner of each projection is merged integrally to the center portion of the resilient member by way of a joint portion.

When the acceleration detector has the above explained structural features, it is preferred that it further comprises upper and lower electrodes for determination of the acceleration in a self-checking manner. The upper electrode is mounted on at least one of the projections of the weight. On the other hand, a lower cover is fixed on the bottom face of the frame in a spaced relation to the weight. The lower electrode is mounted on a bottom surface of the weight in a facing relation to a top surface of the lower cover. The upper and lower electrodes are respectively adapted to apply voltage differences between the upper cover and the upper electrode, and between the lower electrode and the lower cover to develop electrostatic forces in order to displace the weight with respect to the frame. The joint portion is adapted to form a conductor pattern from the upper electrode to a voltage supply.

In particular, the upper electrode consists of a rectangular plate and two triangular plates which are so arranged as to give a generally triangular configuration of the upper electrode as a whole, and the lower electrode is in the form of a triangular configuration. The upper and lower electrodes are horizontally offset such that the resulting two electrostatic forces are cooperative to displace the weight along the X-, Y-, and Z-axes simultaneously.

Other features, objects and advantages of the present invention will become more apparent from the following description and attached drawings about the preferred embodiments.

BRIEF DESCRIPTION OF THE DRAWINGS

FIGS. 17A to 17D are cross-sectional views for explaining the process of forming the detector, wherein FIG. 17A is taken along the line D—D of FIG. 16A, FIG. 17B is take along the line E—E of FIG. 16B, and FIG. 17D is taken along the line F—F of FIG. 16C;

DETAIL DESCRIPTIONS OF PREFERRED EMBODIMENTS

Preferred embodiments of an acceleration detector of the present invention are explained below. However, it should be noted that the present invention is not limited within the embodiments.

First Embodiment

Figure 1:
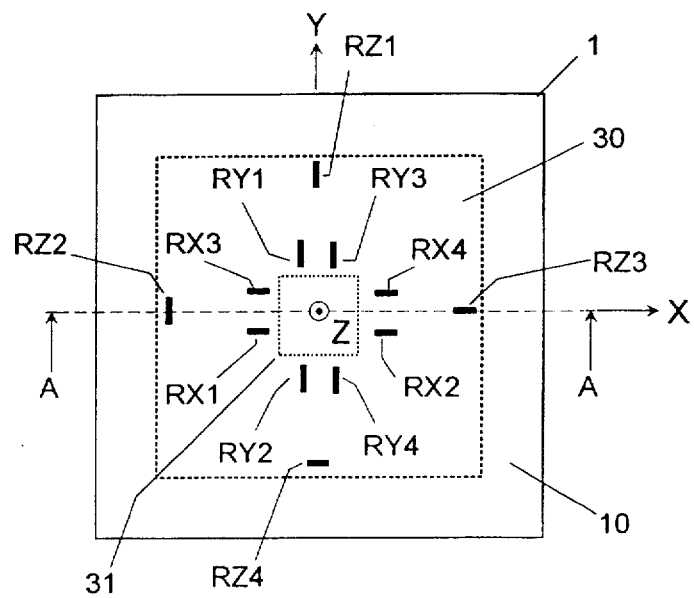
FIG. 1 shows an arrangement of resistance elements of an acceleration detector of a first embodiment of the present invention.
Figure 2:
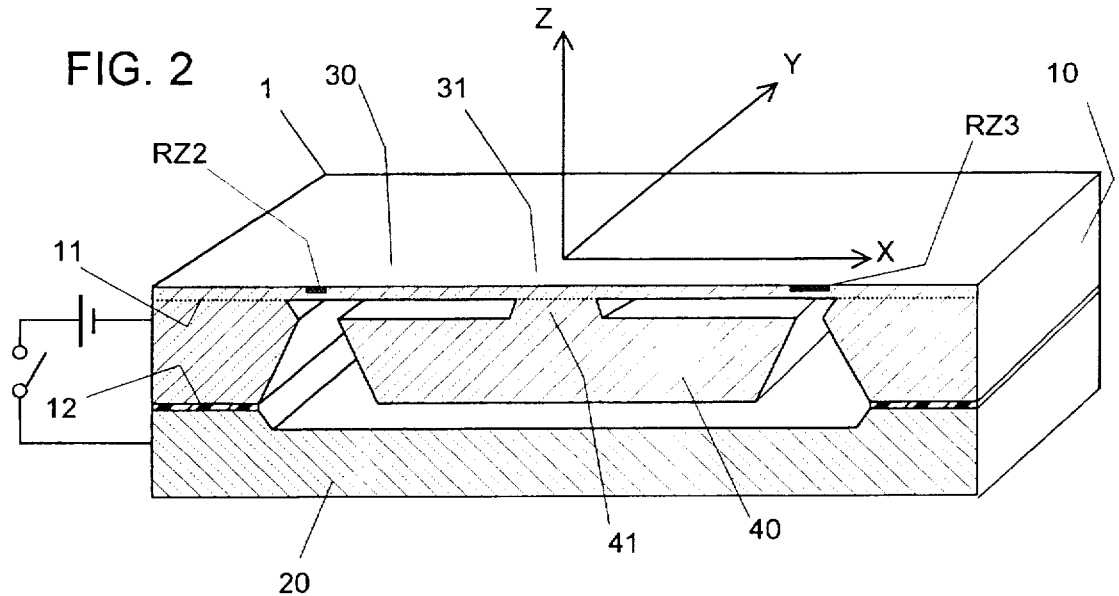
FIG. 2 is a perspective view of the acceleration detector, which is cut away by the line A—A of FIG. 1
Figure 3:
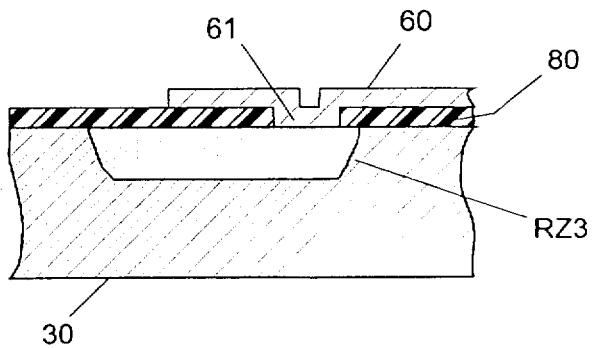
FIG. 3 is an enlarged cross-sectional view of the resistance element RZ3 of FIG. 2.

A diaphragm-type acceleration detector of the first embodiment of the present invention are shown in FIGS. 1 and 2. The detector 1 is capable of sensitively detecting three-dimensional components of acceleration applied thereto independently with respect to three axes X-, Y- and Z- axes of an orthogonal coordinate system. The detector 1 is provided with a frame 10 defining an open space therein and having a top face 11 and a bottom face 12, a bottom cover 20, a thin-sheet resilient member 30, a weight 40 hung from a center portion 31 of the resilient member 30 through a neck portion 41, and a plurality of resistance elements R having a piezo resistance effect which are formed in the resilient member 30. An air gap between the weight 40 and the bottom cover 20 is useful as an air damper for preventing breakage of the detector 1 caused when a frequency of acceleration is equal to a resonance frequency of the detector. The resilient member 30 is fixed at its periphery to the top face 11 of the frame 10. The X- and Y-axes are defined to extend in the general plane of the resilient member 30. The neck portion 41 is connected with the center portion 31 of the resilient member 30 in such a manner as to cause an elastic deformation of the resilient member when the weight 40 is displaced with respect to the rectangular frame 10 by receiving acceleration. The frame 10, the bottom cover 20, resilient member 30 and the weight 40 are made of a semiconductor material such as a N-type silicon. The resistance elements R are formed in the resilient member 30 to be in an elongate shape thereof, as shown in FIG. 3. Impurities are added to a predetermined position of the resilient member 30 by, for example, a thermal diffusion method, to form a P-type silicon as the resistance elements R. An insulation layer (SiO$_2$) 80 is formed on the resilient member 30 for wiring a conductor pattern made of gold or aluminum thereon. For example, as shown in FIG. 3, a conductor pattern 60 formed on the insulation layer 80 extends to the resistance element RZ3 through an opening 61 of the insulation layer. Electric resistance of the resistance elements R is varied in response to strain of the resistance elements accompanied with the elastic deformation of the resilient member 30. As a result, acceleration is determined in accordance with the variation of the electric resistance of the resistance elements by an acceleration determining section (not shown).

The resistance elements R consisting of a first set of four resistance elements RX1–RX4 for detecting a first component of acceleration with respect to the X-axis, a second set of four resistance elements RY1–RY4 for detecting a second component of acceleration with respect to the Y-axis, and a third set of four resistance elements RZ1–RZ4 for detecting a third component of acceleration with respect to the Z-axis. In this embodiment, the resistance elements R are arranged, as shown in FIG. 1. That is, the resistance elements RX1 to RX4 of the first set are arranged at positions adjacent to the opposite sides of the center portion 31 on both sides of the X-axis such that the longitudinal direction thereof is parallel to the X-axis. The resistance elements RY1 to RY4 of the second set are arranged at positions adjacent to the other opposite sides of the center portion 31 on both sides of the Y-axis such that the longitudinal direction thereof is parallel to the Y-axis. In addition, two resistance elements RZ2 and RZ3 of the third set are arranged on the X-axis at opposite positions adjacent to the frame 10, and the other two resistance elements RZ1 and RZ4 are arranged on the Y-axis at the opposite positions adjacent to the frame.

The arrangement of the resistance elements R of the present invention is compared with that of resistance elements of the prior art from the viewpoint of the sensitivity of the acceleration detector 1. For readily understanding the comparison, it is discussed only with respect to the resistance elements RX1 to RX4. The acceleration detector of the prior art is the substantially same as the above explained detector except for the arrangement of the resistance elements.

Figure 4A:
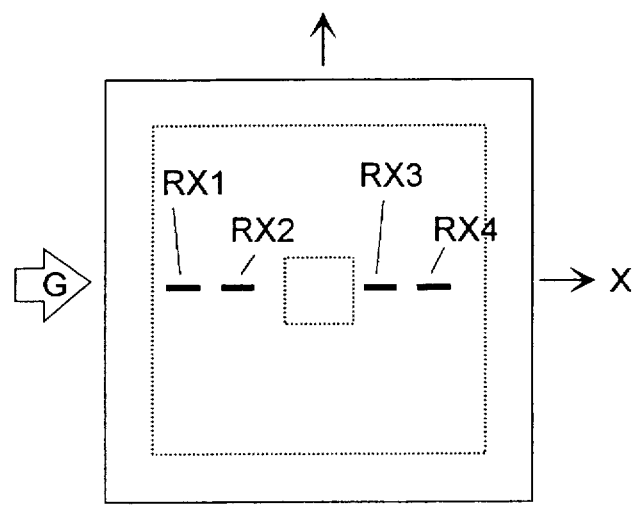
FIGS. 4A and 4B show arrangements of resistance elements RX1-RX4 of the prior art and the present invention, respectively.
Figure 25A:
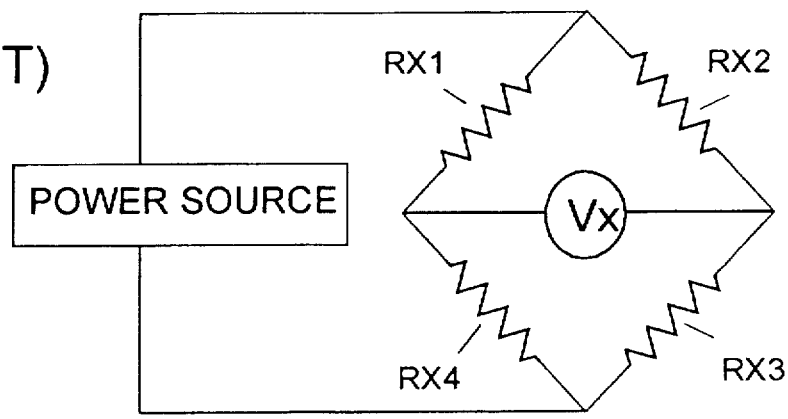
FIGS. 25A to 25C are circuit diagrams showing the bridge configuration of resistance elements with respect to X-, Y- and Z-axes, respectively.
Figure 25B:
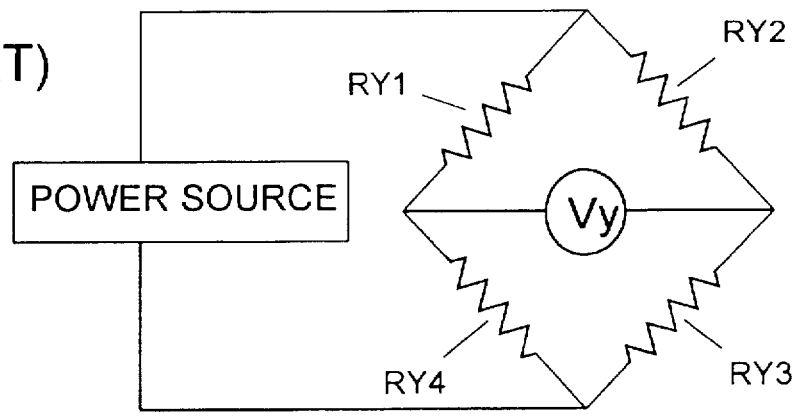
Figure 25C:
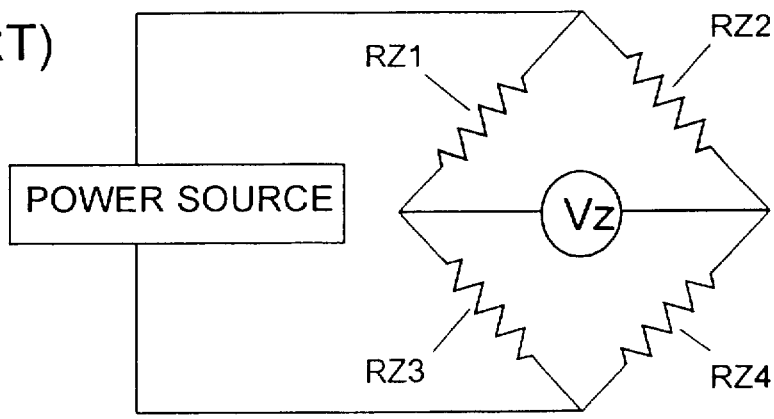
Figure 26A:
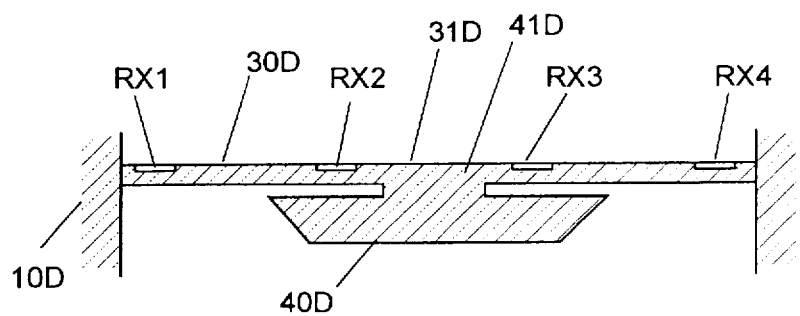
FIGS. 26A to 26E are diagrams helpful for understanding stresses received resistance elements when acceleration is applied to a beam-type acceleration detector of the prior art.
Figure 26B:
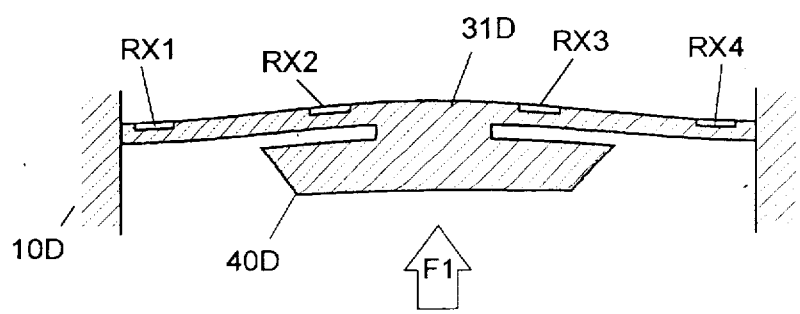
Figure 26C:
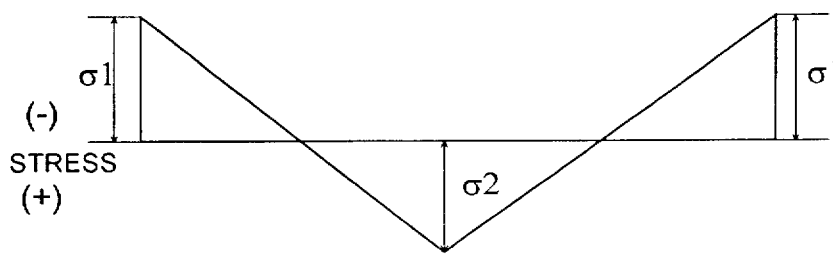
Figure 26D:
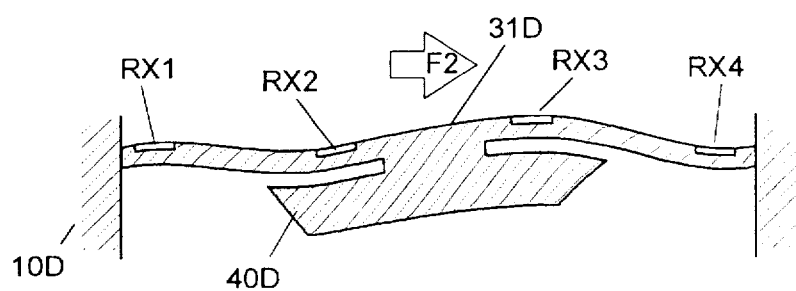
Figure 26E:
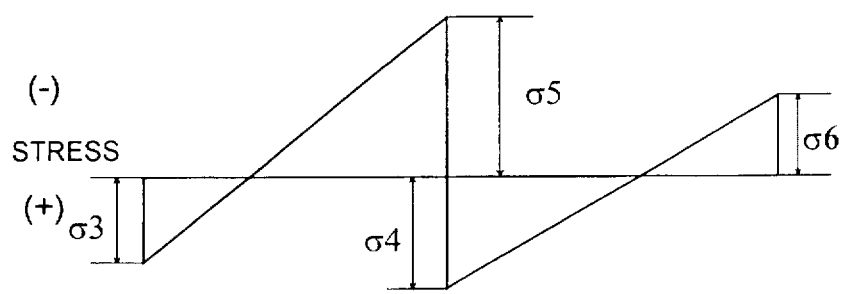

As an arrangement of resistance elements RX1 to RX4 of the prior art, the resistance elements are aligned on the X-axis, as shown in FIG. 4A. When acceleration G is applied to a weight 40 of the detector in the X-axis direction, the resilient member 30 is elastically deformed, as shown in FIG. 26D, and stress is applied to each resistance element, as shown in earlier in the FIG. 26E. As explained in "Disclosure of the Prior Art" the absolute value of the compressive or tensile stress received by the resistance element adjacent to the frame 10 is equal to half of that of the compressive or tensile stress received the resistance element adjacent to the center portion 31. Therefore, in this case, the resistant elements RX1, RX3 respectively receive tensile stresses ρ and 2σ which are plus values, and the resistance elements RX2 and RX4 respectively receive compressive stresses 2σ and σ which are minus values. Electric resistance of the resistance elements RX1 to RX4 are respectively given by the following equations, $$RX1 = \Omega \times (1 + \pi\lambda \times \sigma) \quad [1]$$

$$RX2 = \Omega \times (1 - \pi\lambda \times 2\sigma) \quad [2]$$

$$RX3 = \Omega \times (1 + \pi\lambda \times 2\sigma) \quad [3]$$

$$RX4 = \Omega \times (1 - \pi\pi \times \sigma) \quad [4]$$

wherein Ω is electric resistance of the resistant elements measured without applying the acceleration G, and $\pi\lambda$ is a piezo resistance coefficient. When a bridge circuit is formed by the resistance elements RX1 to RX4, as shown in FIG. 25A, a bridge voltage is given by the following equation [5], $$V=I\times(RX1\times RX3 - RX2\times RX4)/(RX1+RX2+RX3+RX4) \quad [5]$$

wherein I is a predetermined current delivered from a power source to the bridge circuit. By substituting the above equations [1] to [4] for the equation [5], the bridge voltage obtained by the prior art's arrangement of the resistance elements is expressed by the following equation [6], $$V=1.5\times\Omega\times\pi\lambda\times\sigma\times I \quad [6].$$

Figure 4B:
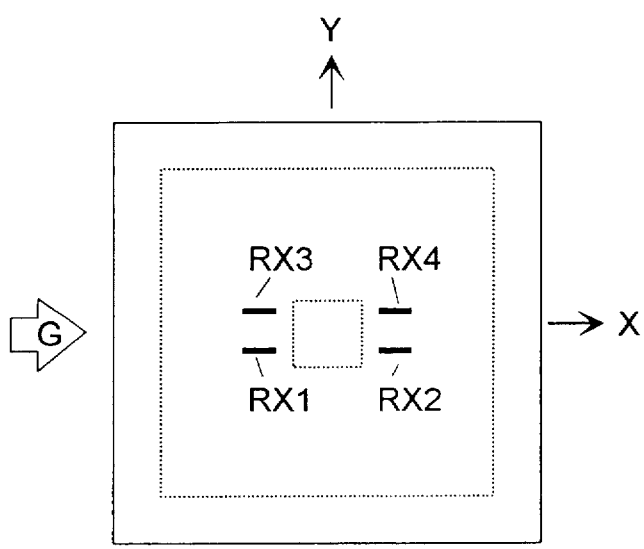

On the other hand, the arrangement of the resistance elements RX1 to RX4 of the present invention is described above and shown in FIG. 4B. When the acceleration G is applied to the weight 40, the resistant elements RX2 and RX4 receive a tensile stress $2\sigma$, and the resistance elements RX1 and RX3 receive a compressive stress $2\sigma$ which is minus value. Therefore, electric resistance of the resistance elements RX1 to RX4 are given by the following equations [7] and [8], $$RX1=RX3=\Omega\times(1-\pi\lambda\times 2\sigma) \quad [7]$$

$$RX2=RX4=\Omega\times(1+\pi\lambda\times 2\sigma) \quad [8].$$

By substituting the above equations [7] and [8] for the equation [5], the bridge voltage is expressed by the following equation [9], $$V=2\times\Omega\times\pi\lambda\times\sigma\times I \quad [9].$$

By comparing the equation [6] with the equation [9], it is concluded that the bridge voltage obtained by the arrangement of the resistance elements of the present invention is about 1.33 times as large as that obtained by the prior art's arrangement thereof. Though the above comparison is performed with respect to the X-axis, the same result is obtained with respect to the Y-axis. Therefore, by adopting the arrangement of the resistance elements of the present invention, an acceleration detector having an improved sensitively thereof with respect to the X- and Y-axes is obtained.

Figure 5:
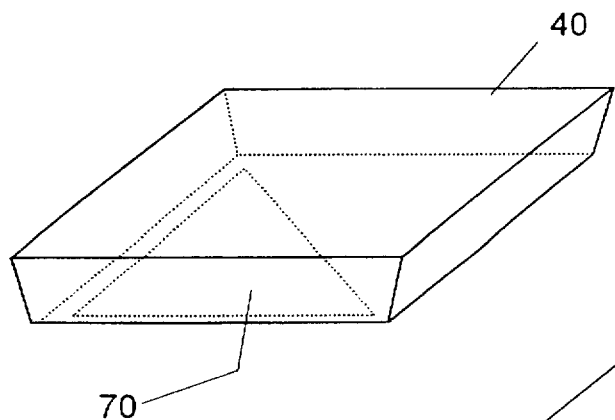
FIG. 5 is a perspective view illustrating a position of an electrode mounted on a weight of the detector.
Figure 6:
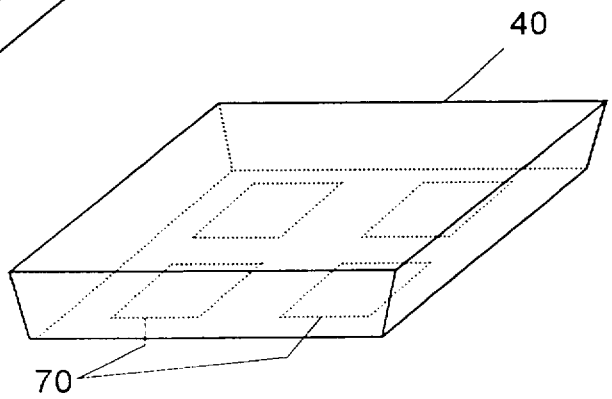
FIG. 6 is a perspective view illustrating positions of another electrode mounted on the weight.

By the way, it is preferred that an electrode is mounted on a bottom surface of the weight 40 so as to be in a facing relation with the bottom cover 20. When a voltage difference is applied between the electrode and the bottom cover 20 to develop an electrostatic force therebetween, it is possible to displace the weight 40 with respect to the frame 10 by the electrostatic force without applying acceleration to the weight 40 to thereby check whether the detector normally operates in a self-checking manner. For example, as shown in FIG. 5, a triangular electrode 70 is mounted on the bottom surface of the weight 40 to displace the weight along the X-, Y- and Z-axes simultaneously by an electrostatic force developed between the electrode 70 and the bottom cover 20. For obtaining an increased electrostatic force, it is also possible to mount an auxiliary electrode (not shown) on a side face of the weight 40 adjacent to the triangular electrode 70. In addition, it is preferred that four rectangular electrodes 71 are mounted, as shown in FIG. 6, to displace the weight 40 independently with respect to the X-, Y- and Z-axes.

[Second Embodiment]

Figure 7:
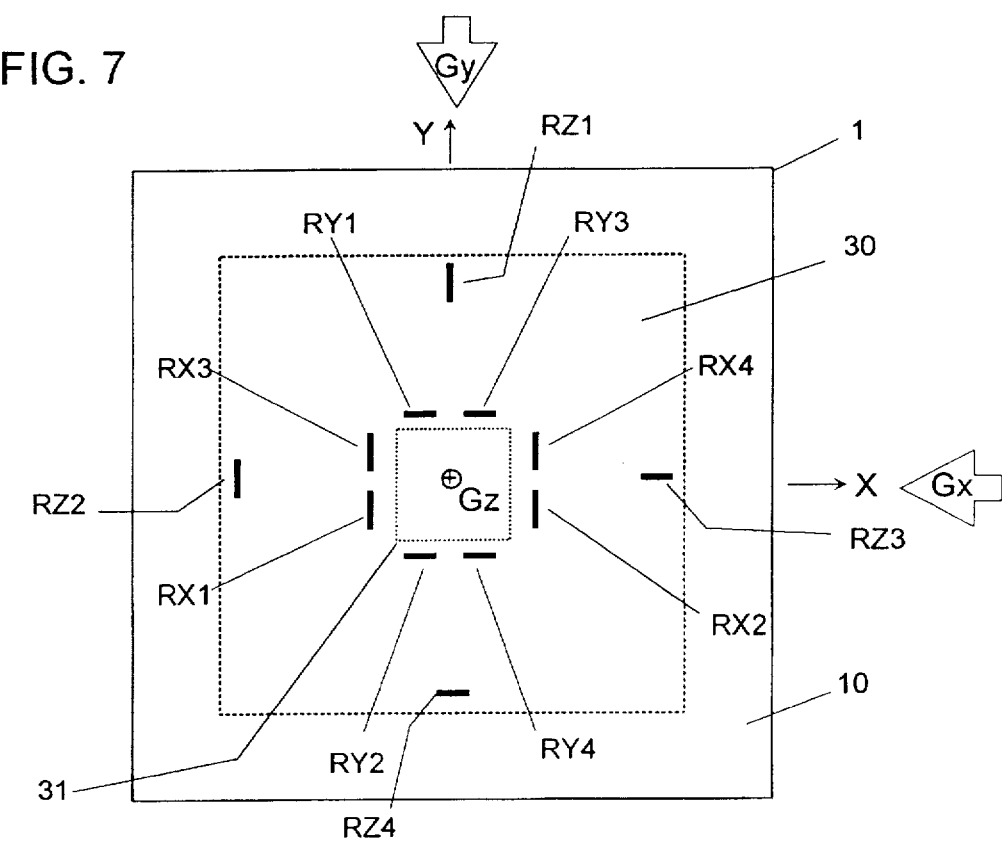
FIG. 7 shows an arrangement of resistance elements of a second embodiment of the present invention.

An acceleration detector of the second embodiment is a substantially same as that of the first embodiment except that the resistance elements R are arranged, as shown in FIG. 7, in place of the arrangement of the resistance elements of FIG. 1. That is, the resistance elements RX1 to RX4 of the first set are arranged at positions adjacent to the opposite sides of the center portion 31 on both sides of the X-axis such that the longitudinal direction thereof is parallel to the Y-axis. The resistance elements RY1 to RY4 of the second set are arranged at positions adjacent to the other opposite sides of the center portion 31 on both sides of the Y-axis such that the longitudinal direction thereof is parallel to the X-axis. An arrangement of the resistance elements RZ1 to RZ4 is the same as that of the first embodiment. When acceleration is applied to the weight 40 in the X-axis direction indicated by the arrow "Gx" of FIG. 7, in the Y-axis direction indicated by the arrow "Gy" and in the Z-axis direction indicated by "Gz" (an downward direction perpendicular to the paper plane in FIG. 7), a variation of electric resistance of each resistance element is listed on Table 1. On Table 1, plus (+) and minus (−) signs designate an increase in the electric resistance and a decrease in the electric resistance, respectively. In addition, "0" designates that no stress is applied to the resistance element.

TABLE 1

| | RX1 | RX2 | RX3 | RX4 | RY1 | RY2 | RY3 | RY4 | RZ1 | RZ2 | RZ3 | RZ4 |
|---|---|---|---|---|---|---|---|---|---|---|---|---|
| Gx | − | + | − | + | 0 | 0 | 0 | 0 | 0 | + | + | 0 |
| Gy | 0 | 0 | 0 | 0 | + | − | + | − | + | 0 | 0 | + |
| Gz | + | + | + | + | + | + | + | + | + | − | + | − |

[Third Embodiment]

Figure 8:
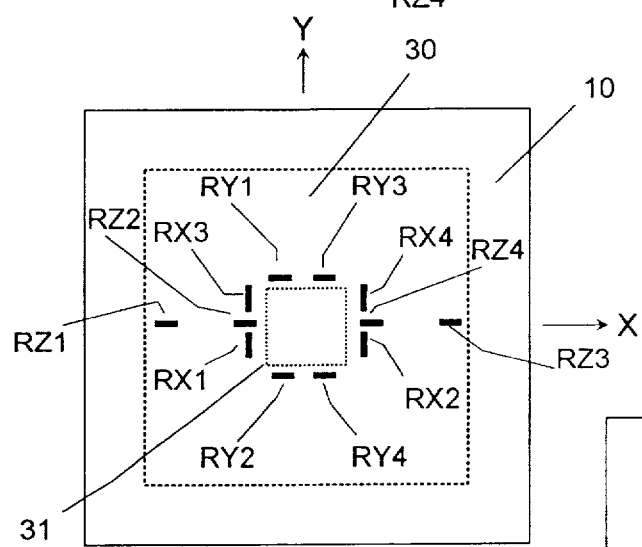
FIG. 8 shows an arrangement of resistance elements of a third embodiment of the present invention.

An acceleration detector of the third embodiment is a substantially same as that of the second embodiment except that the resistance elements are arranged, as shown in FIG. 8, in place of the arrangement of the resistance elements of FIG. 7. That is, an arrangement of the resistance elements RX1 to RX4 and RY1 to RY4 is the same as that of the second embodiment. The resistance elements RZ1 to RZ4 are aligned on the X-axis.

[Fourth Embodiment]

Figure 9:
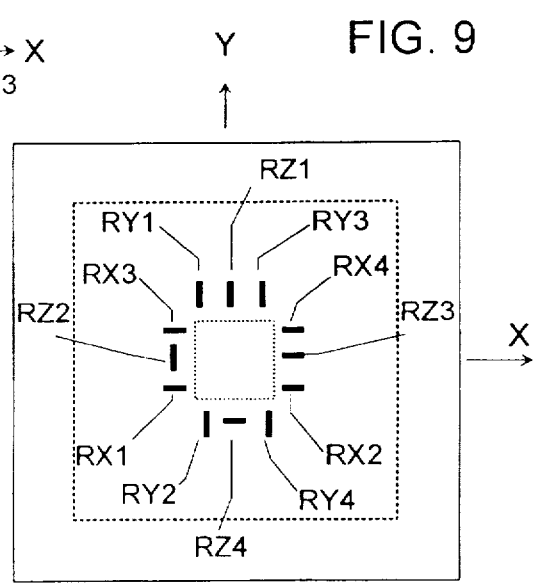
FIG. 9 shows an arrangement of resistance elements of a fourth embodiment of the present invention.

An acceleration detector of the fourth embodiment is a substantially same as that of the first embodiment except that the resistance elements are arranged, as shown in FIG. 9, in place of the arrangement of the resistance elements of FIG. 1. That is, an arrangement of the resistance elements RX1 to RX4 and RY1 to RY4 is the same as that of the first embodiment. The resistance elements RZ1 to RZ4 are respectively arranged at positions adjacent to four sides of the center portion 31 on the X- and Y-axes such that the longitudinal direction of the resistance elements RZ1 and RZ2 is parallel to the Y-axis and the longitudinal direction of the resistance elements RZ3 and RZ4 is parallel to the X-axis.

Eventually, by adopting any one of the arrangements of the resistance elements of second to fourth embodiments, an acceleration detector having an improved sensitively thereof with respect to the X- and Y-axes is obtained.

[Fifth Embodiment]

Figure 10A:
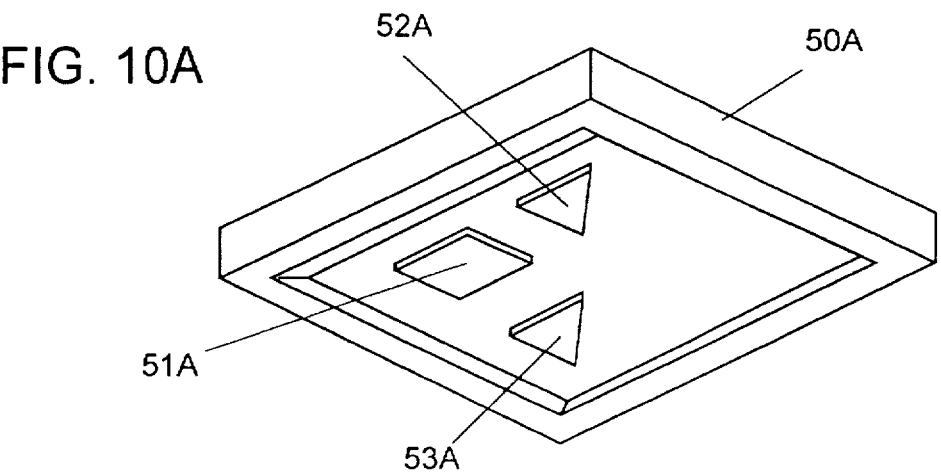
FIGS. 10A to 10C are exploded perspective views of a beam-type acceleration detector of a fifth embodiment of the present invention.
Figure 10B:
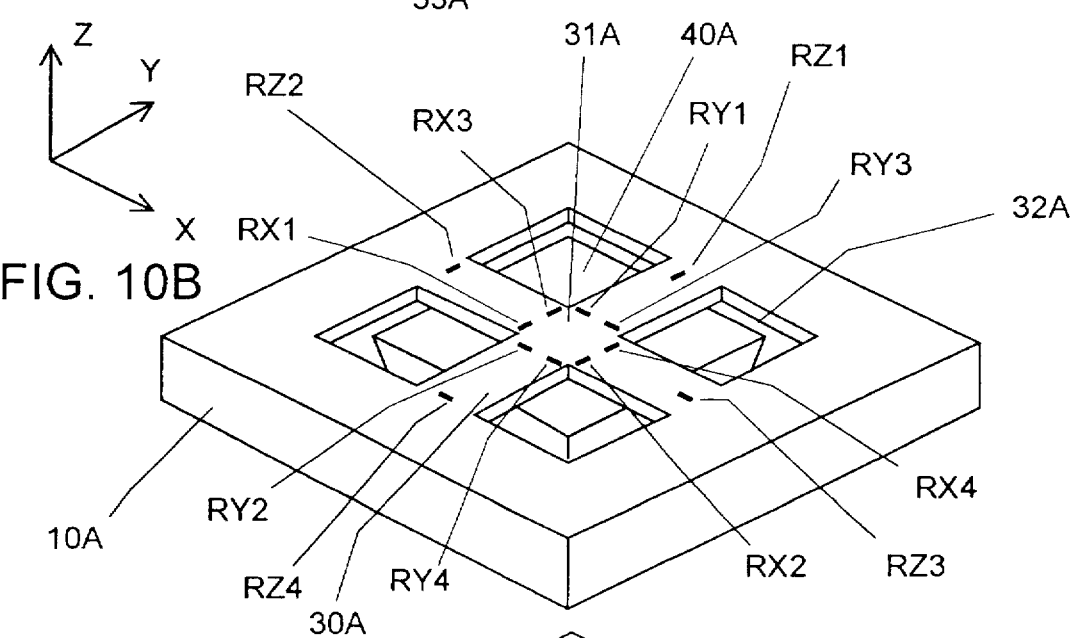
Figure 10C:
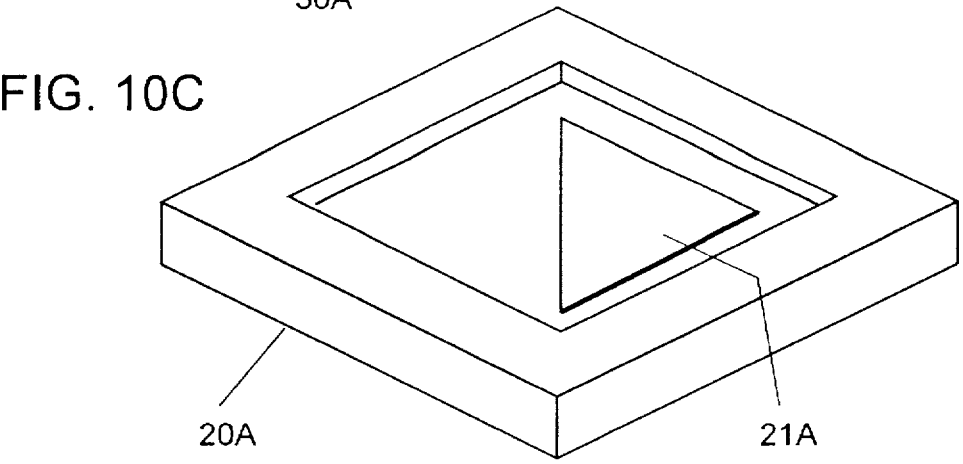
Figure 11:
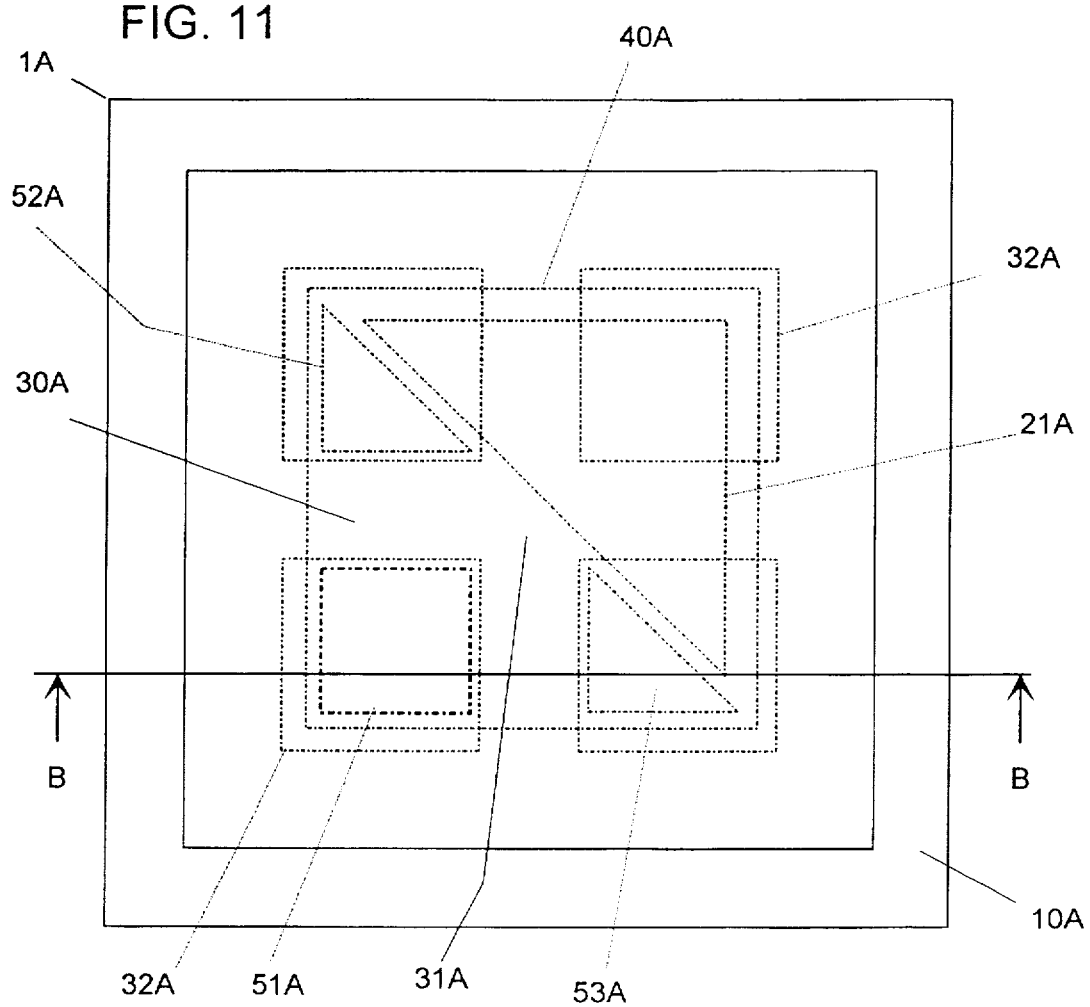
FIG. 11 is a top plan view of the acceleration detector of the fifth embodiment.
Figure 12:
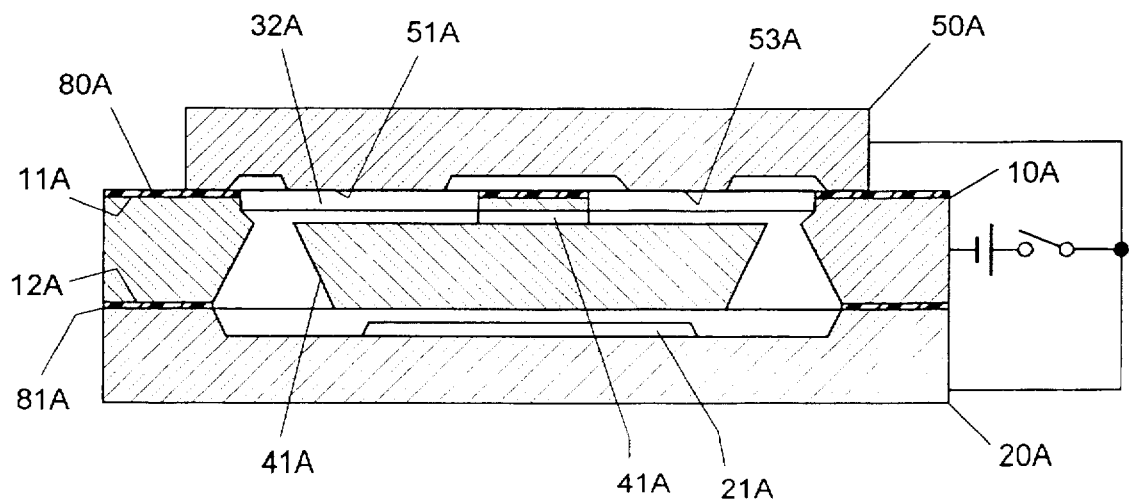
FIG. 12 is a cross-sectional view of the acceleration detector which is taken along the line B—B of FIG. 11.

A beam-type acceleration detector 1A of the fifth embodiment of the present invention is shown in FIGS. 10A–10C, 11, and 12. The detector 1A is provided with a bottom electrode 20A, a frame 10A, a thin-sheet resilient member 30A, a weight 40A, a plurality of resistance elements R having a piezo resistance effect, and a top electrode 50A. The frame 10A has an open space which is covered with the resilient member 30A by fixing the periphery of the resilient member to a top face 11A of the frame 10A. The weight 40A is hung down from a center portion 31A of the resilient member 30A through a neck portion 41A. X- and Y-axes of a three-dimensional coordinate system are defined to extend in the general plane of the resilient member 30A. The neck portion 41A is connected with the center portion 31A of the resilient member 30A in such a manner as to cause an elastic deformation of the resilient member when the weight 40A is displaced with respect to the frame 10A by receiving acceleration. The resilient member 30A is formed with four rectangular holes 32A around the center portion 31A so as to be shaped into a cross beam configuration. The resistance elements R are formed in the resilient member 30A in accordance with the same method as the first embodiment. Any one of the arrangements of the resistance elements introduced in the first to fourth embodiments can be adopted in this embodiment, for example, as shown in FIG. 10B. The top electrode 50A is fixed on the top face 11A of the frame 10A such that a rectangular projection 51A and two triangular projections 52A and 53A formed on the top electrode 50A are faced to an upper surface of the weight 40A through the rectangular holes 32A and are spaced away from the resilient member 30A. These projections 51A, 52A and 53A are arranged as to give a generally triangular configuration as a whole, as shown in FIG. 10A or 12. The top electrode 50A is insulated from the frame 10A, resilient member 30A and the weight 40A by a first insulation layer 80A. The top electrode 50A is adapted to apply a voltage difference between the top electrode and the weight 40A to develop a first electrostatic force in order to displace the weight with respect to the frame 10A.

On the other hand, the bottom electrode 20A is fixed on a bottom face 12A of the frame 10A such that a bottom projection 21A formed on the bottom electrode is faced to a bottom surface of the weight 40A and is spaced away from the weight. The bottom projection 21A is in the form of a triangular configuration. The bottom electrode 20A is insulated from the frame 10A, the resilient member 30A and weight 40A by a second insulation layer 81A. The bottom electrode 20A is adapted to apply a voltage difference between the bottom electrode and the weight 40A to develop a second electrostatic force in order to displace the weight with respect to the frame 10A. The projections 51A to 53A and the bottom projection 21A are horizontally offset, as shown in FIG. 11, in such a relation that the first and second electrostatic forces are cooperative to displace the weight 40A along the X-, Y- and Z-axes simultaneously. Therefore, the weight 40A can be displaced by the electrostatic forces without applying acceleration to the weight 40A of the detector 1A, to thereby check whether the detector normally operates in a self-checking manner. In addition, a first air gap between the projections 51A to 53A and the weight 40A, and a second air gap between the bottom projections 21A and the weight 40A are useful as an air damper for preventing a breakage of the detector 1A when a frequency of acceleration is equal to a resonance frequency of the detector.

When the beam-type acceleration detector 1A adopts the arrangement of the resistance elements R of the present invention, an improved sensitivity of the detector with respect to X- and Y-axes is obtained.

[Sixth Embodiment]

Figure 13A:
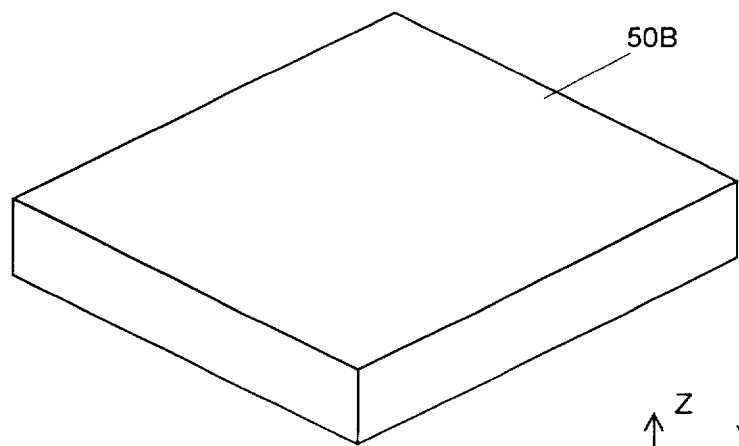
FIGS. 13A to 13C are exploded perspective views of a beam-type acceleration detector of a sixth embodiment of the present invention.
Figure 13B:
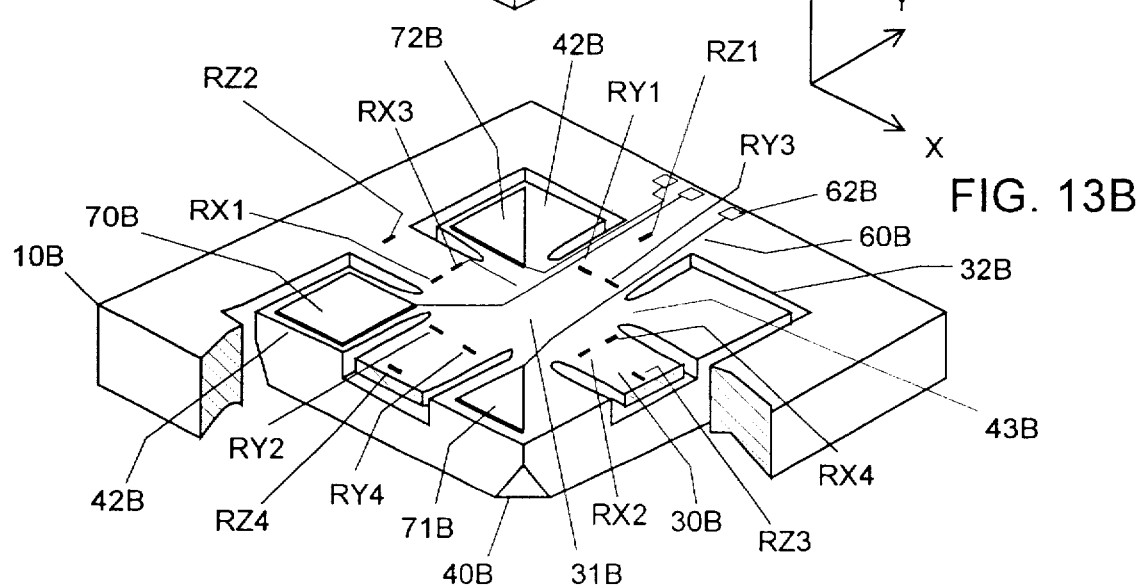
Figure 13C:
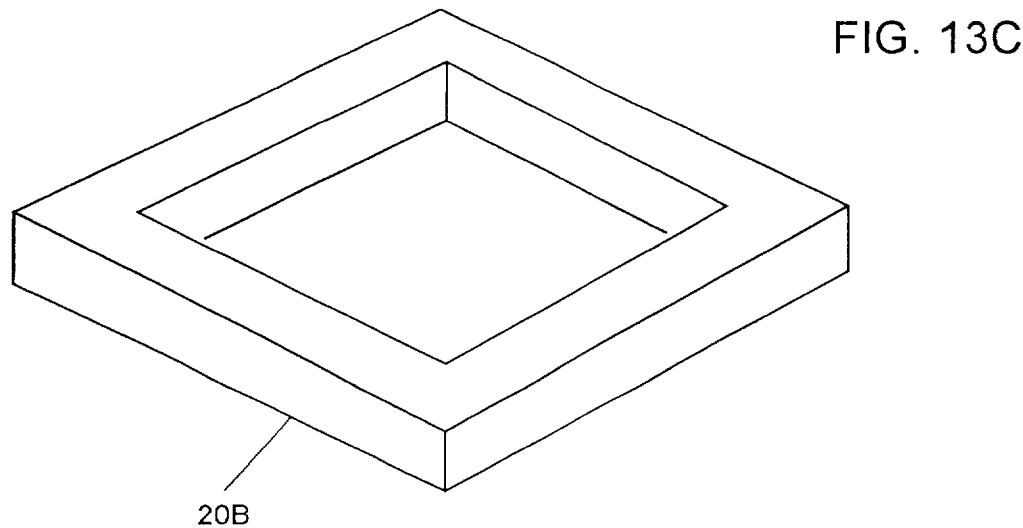
Figure 14:
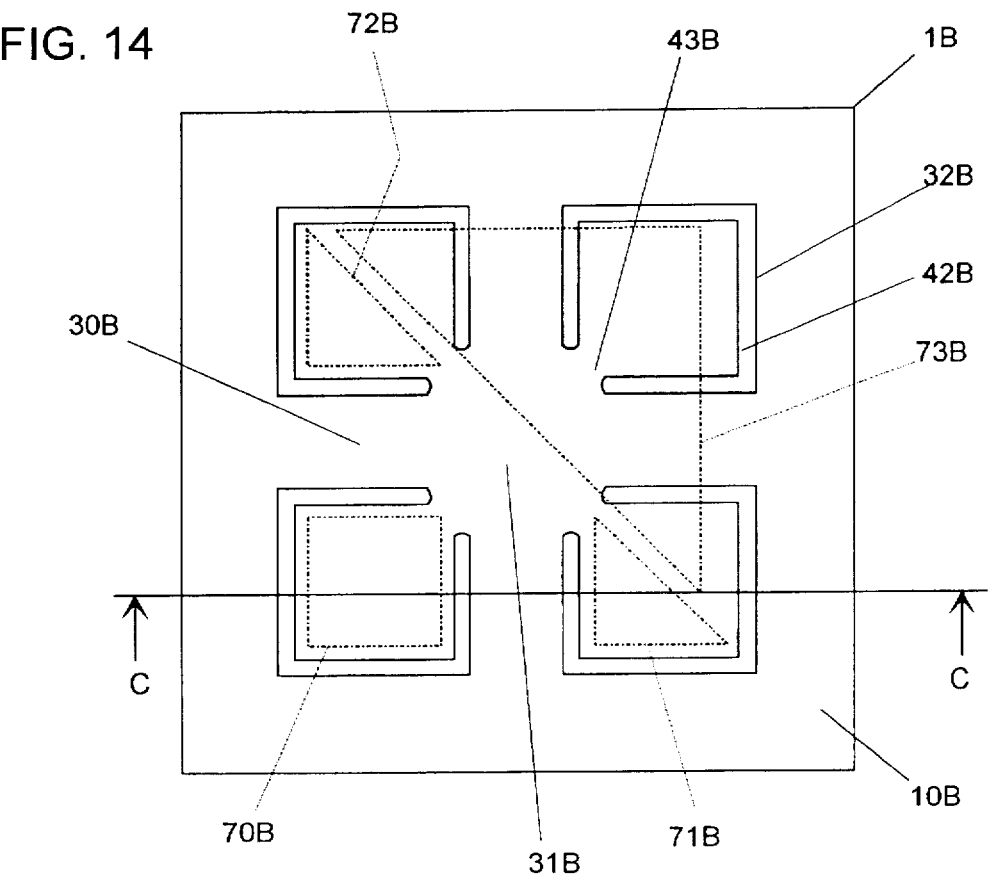
FIG. 14 is a top plan view of the acceleration detector of the sixth embodiment.

A beam-type acceleration detector 1B of the sixth embodiment of the present invention is shown in FIGS. 13A–13C, 14, and 15. The detector 1B is provided with a bottom cover 20B, a frame 10B, a thin-sheet resilient member 30B, a weight 40B, a plurality of resistance elements R having a piezo resistance effect, and a top cover 50B. The frame 10B has an open space which is covered with the resilient member 30B by fixing the periphery of the resilient member to a top face 11B of the frame 10B. The weight 40B is hung down from a center portion 31B of the resilient member 30B through a neck portion 41B. The neck portion 41B is connected with the center portion 31B of the resilient member 30B in such a manner as to cause an elastic deformation of the resilient member when the weight 40B is displaced with respect to the frame 10B by receiving acceleration. The resilient member 30B is formed with four rectangular holes 32B around the center portion 31B so as to be shaped into a cross beam configuration. X- and Y-axes of a three-dimensional coordinate system are defined to extend in the general plane of the resilient member 30B. Any one of the arrangements of the resistance elements introduced in the first to fourth embodiments can be adopted in this embodiment, for example, as shown in FIG. 13B. The resistance elements R are formed in the resilient member 30B in accordance with the same method as the first embodiment. The weight 40B is formed with four rectangular projections 42B which project respectively into the rectangular holes 32B of the resilient member 30B in such a manner that a top surface of each projection is flush with a top surface of the resilient member. In addition, a corner of each projection 42B is integrally merged with the center portion 41B by a joint portion 43B. A rectangular electrode 70B and two triangular electrodes 71B and 72B are mounted on the projections 42B so as to give a generally triangular configuration as a whole, as shown in FIG. 14. A first insulation layer 80B is formed on the projections 42B, the resilient member 30B and the joint portion 43B. The joint portion 43B is useful to form on the first insulation layer 80 B a conductor pattern 60B made of gold or aluminum which extends from each of the electrodes 70B to 72B to a bonding pad 62B.

Figure 15:
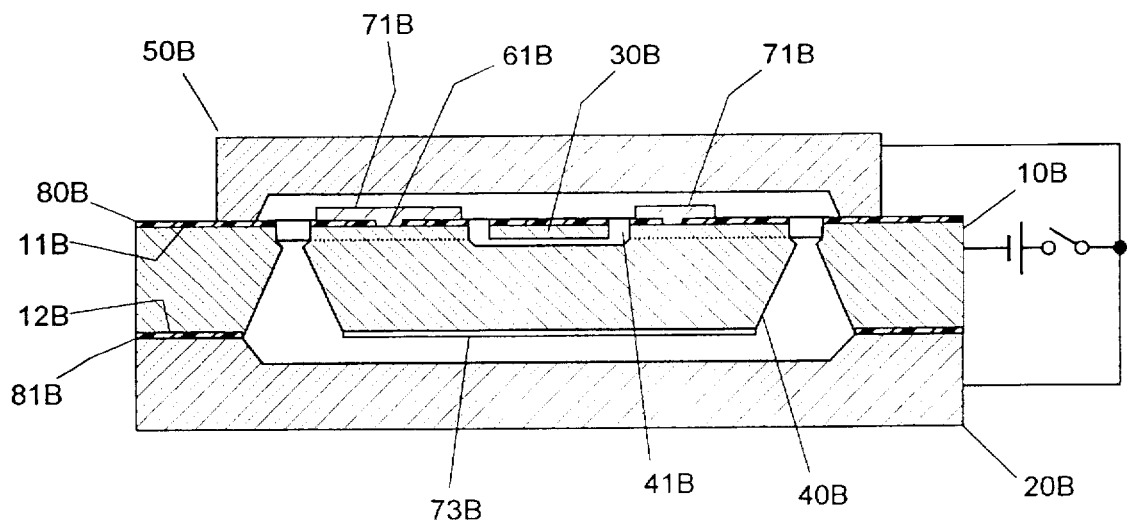
FIG. 15 is a cross-sectional view of the acceleration which is taken along the line C—C of FIG. 14.

On the other hand, a bottom electrode 73B is mounted on a bottom surface of the weight 40B, as shown in FIG. 15. The bottom electrode 73B is in the form of a triangular configuration. Since each of the electrodes 70B to 72B extends to the weight 40B through an opening 61B of the first insulation layer 80B, a voltage applied to the electrodes 70B to 72B can be also applied to the bottom electrode 73B.

Figure 16A:
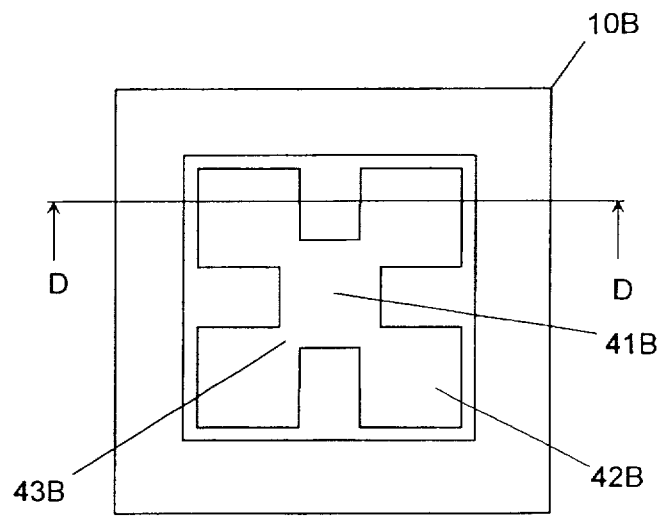
FIGS. 16A to 16C are plan views for explaining a process of forming the acceleration detector of the sixth embodiment.
Figure 16B:
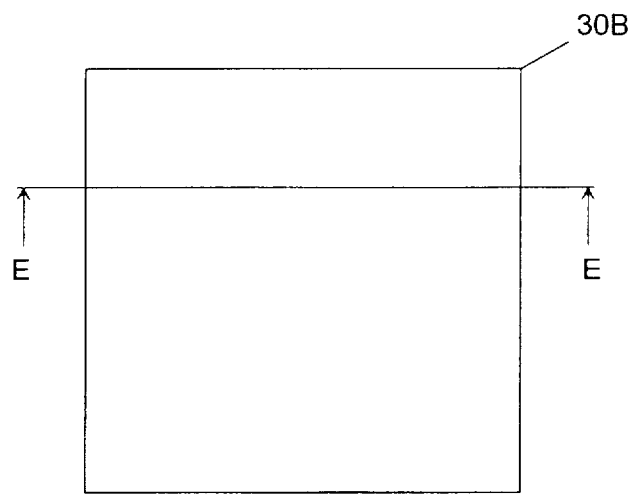
Figure 16C:
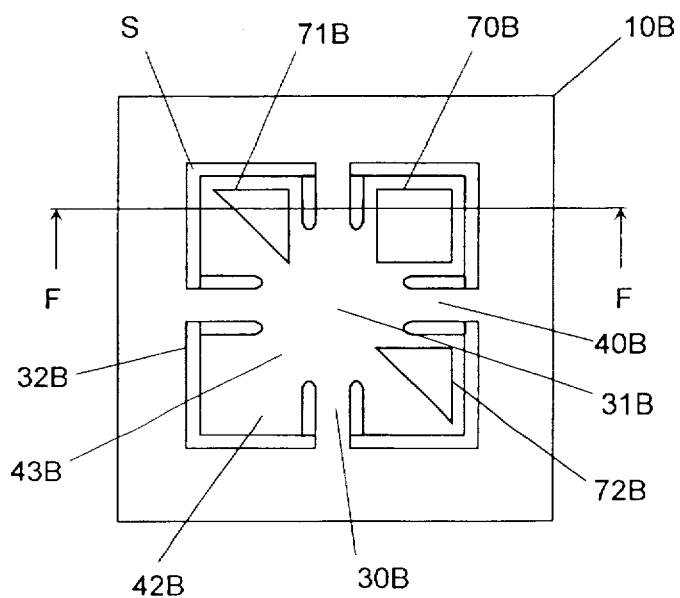
Figure 17A:
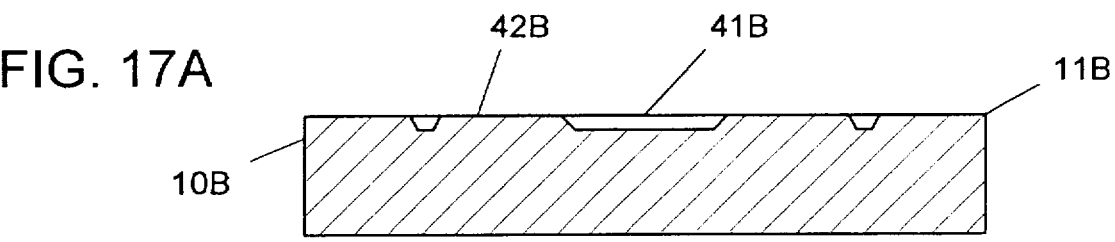
Figure 17B:
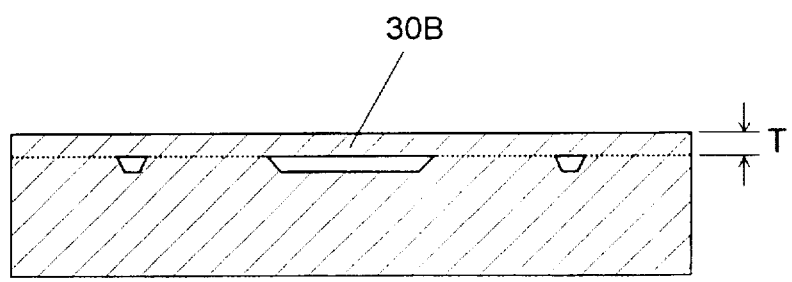
Figure 17C:
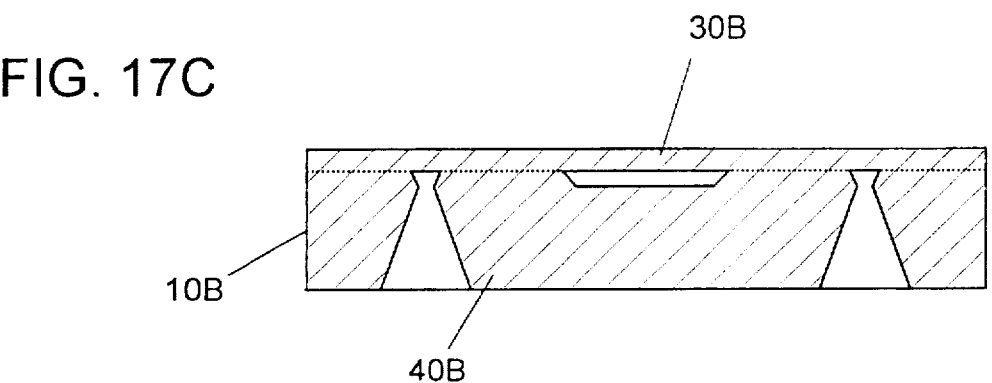
Figure 17D:
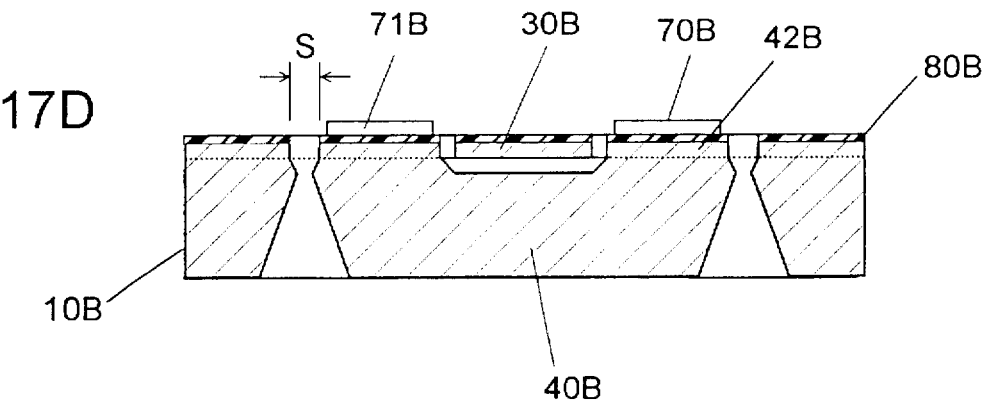

A process of manufacturing parts of the acceleration detector 1B, that is, the frame 10B, resilient member 30B and the electrodes 70B to 72B on the weight 40B, is shown in FIGS. 16A to 16C and 17A–17D. Firstly, a pattern of the frame 10B, four rectangular projections 42B, the neck portion 41B and joint portions 43B is formed in a N-type silicon substrate by an etching method with the use of potassium hydroxide, as shown in FIGS. 16A and 17A. Subsequently, a N-type silicon wafer is directly jointed on the pattern, and ground to obtain the resilient member 30B having a predetermined thickness T and a mirror-polished surface thereof, as shown in FIGS. 16B and 17B. A clearance between the weight 40B and frame 10B is formed by carrying out the etching method from the bottom surface of the silicon substrate, as shown in FIG. 17C. Then, slits S extending between the projections 42B and the frame 10B and between the projections and the resilient member 30B are formed by a reactive ion etching method, as shown in FIG. 16C. A silicon oxide ($SiO_2$) layer is formed as the first insulation layer 80B on top surfaces of the projections 42B, the resilient member 30B and the top face 11B of the frame 10B. The resistance elements R having a piezo resistance effect are formed in the resilient member 30B prior to the formation of the first insulation layer 80B. The rectangular and triangular electrodes 70B to 72B made of gold are formed on the first insulation layer 80B on the rectangular projections 42B, as shown in FIG. 17D. It is to be noted that the above described process is shown as merely one example, and therefore it is possible to adopt another process for manufacturing the acceleration detector of the present invention.

The top cover 50B is fixed on the top face 11B of the frame 10B such that the electrodes 70B to 72B are spaced away from a bottom surface of the top cover. Similarly, the bottom cover 20B is fixed on a bottom face 12B of the frame 10B such that the bottom electrode 73B is spaced away from a top surface of the bottom cover 20B, as shown in FIG. 15. The top and bottom covers 50B and 20B are respectively insulated from the frame 10B, the resilient member 30B and weight 40B by first and second insulation layers 80B and 81B. The rectangular and triangular electrodes 70B to 72B are adapted to apply a voltage difference between the electrodes and the top cover 50B to develop a first electrostatic force in order to displace the weight 40B with respect to the frame 10B. The bottom electrode 73B is adapted to apply a voltage difference between the lower electrode and the bottom cover 20B to develop a second electrostatic force in order to displace the weight 40B with respect to the frame 10B. The electrodes 70B to 72B and the bottom electrodes 73B are horizontally offset, as shown in FIG. 14, in such a relation that the first and second electrostatic forces are cooperative to displace the weight 40B along the X-, Y- and Z-axes simultaneously. Therefore, the weight 40B can be displaced by the electrostatic forces without applying acceleration thereto, to thereby check whether the acceleration detector 1B normally operates in a self-checking manner. For obtaining an increased electrostatic force, it is preferred that a side electrode (not shown) is mounted on at least one of two side faces of the weight 40B which are adjacent to the triangular configuration of the electrodes 70B to 72B. In addition, a first air gap between the electrodes (70B to 72B) and the top cover 50B, and a second air gap between the bottom electrode 73B and the bottom cover 20B are useful as an air damper for preventing a breakage of the detector when a frequency of acceleration is equal to a resonance frequency of the detector 1B.

Eventually, when the beam-type acceleration detector 1B adopts the arrangement of the resistance elements R of the present invention, an improved sensitivity of the detector with respect to X- and Y-axes is obtained.

Figure 18:
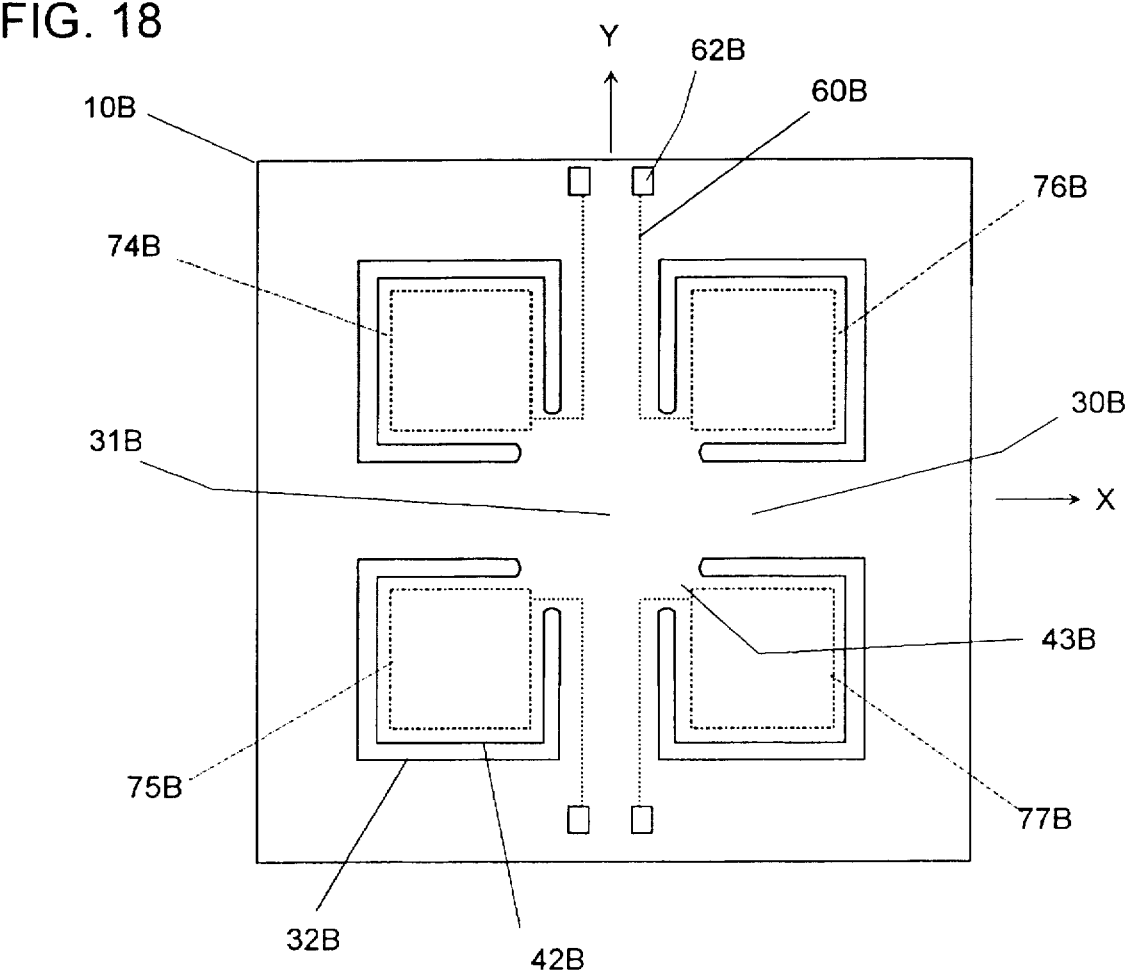
FIG. 18 is a top plan view of a beam-type acceleration detector of a modification of the sixth embodiment.

As a modification of the acceleration detector 1B of the sixth embodiment, it is preferred that four rectangular electrodes 74B to 77B are formed on the rectangular projections 42B in place of the rectangular and triangular electrodes 70B to 72B, as shown in FIG. 18. For example, when a voltage difference is applied between the electrodes (74B and 75B) and the top cover 50B, the weight 40B can be displaced with respect to the X-axis. When a voltage difference is applied between the electrodes (74B and 76B) and the top cover 50B, the weight 40B can be displaced with respect to the Y-axis. An electrostatic force developed for displacing the weight 40B with respect to the X- or Y-axis in this modification is one and half times or more as large as the electrostatic force developed in the sixth embodiment. In addition, when a voltage difference is applied between all of the rectangular electrodes (74B to 77B) and the top cover 50B, the weight 40B can be displaced with respect to the Z-axis. In this case, an electrostatic force developed between the electrodes 74B to 77B and the top cover 50B is twice as large as that developed between the electrodes 70B to 72B and the top cover. Therefore, the acceleration detector of this modification is capable of displacing the weight 40B independently with respect to X-, Y- and Z-axes by the electrostatic force developed between the selected electrodes and top cover 50B.

Figure 19:
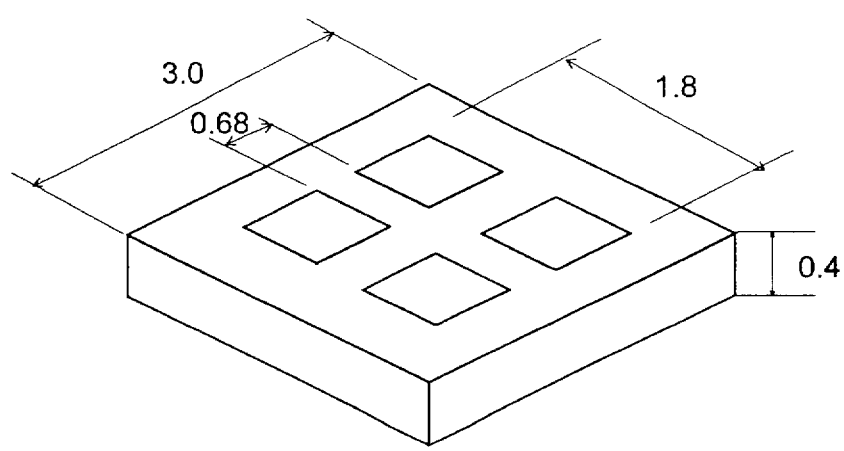
FIG. 19 is a perspective view showing an adequate size of a beam-type acceleration detector from the viewpoint of resonance frequency thereof.
Figure 20:
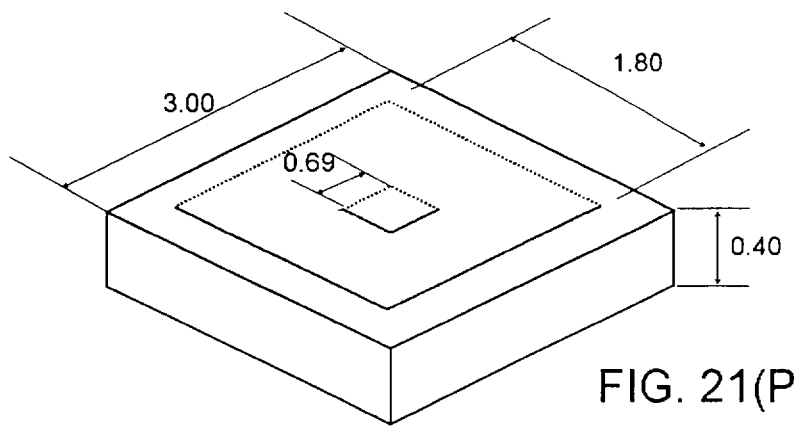
FIG. 20 is a perspective view showing an adequate size of a diaphragm-type acceleration detector from the viewpoint of resonance frequency thereof.
Figure 21:
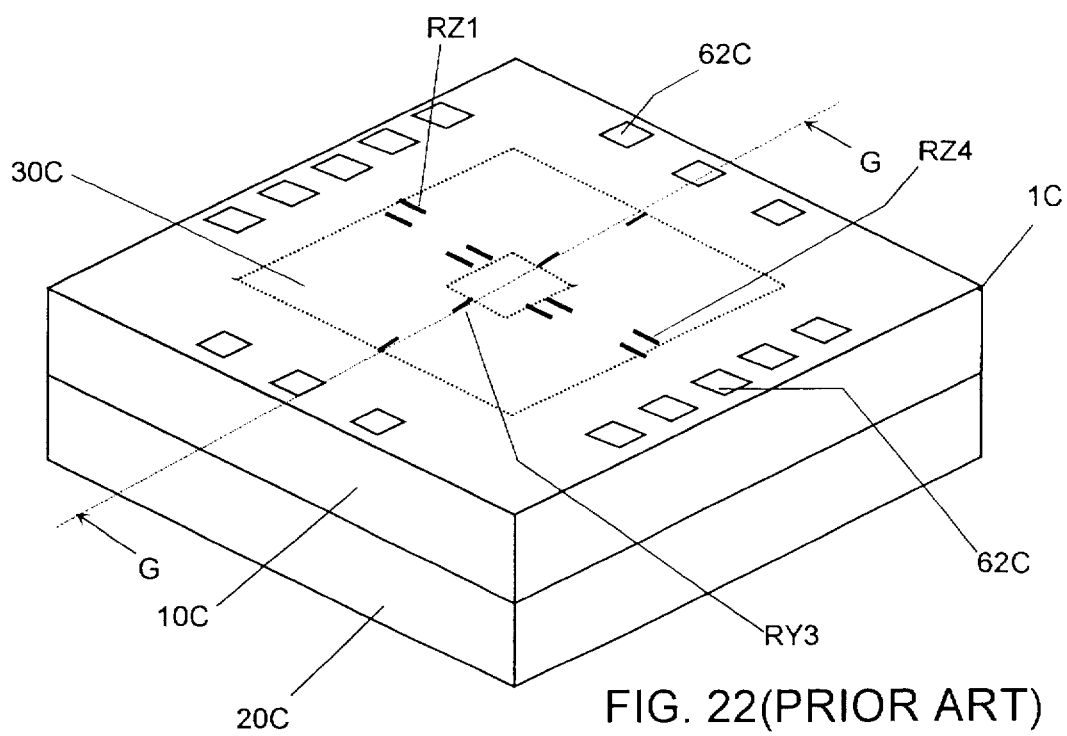
FIG. 21 is a perspective view of a diaphragm-type acceleration detector of the prior art.
Figure 22:
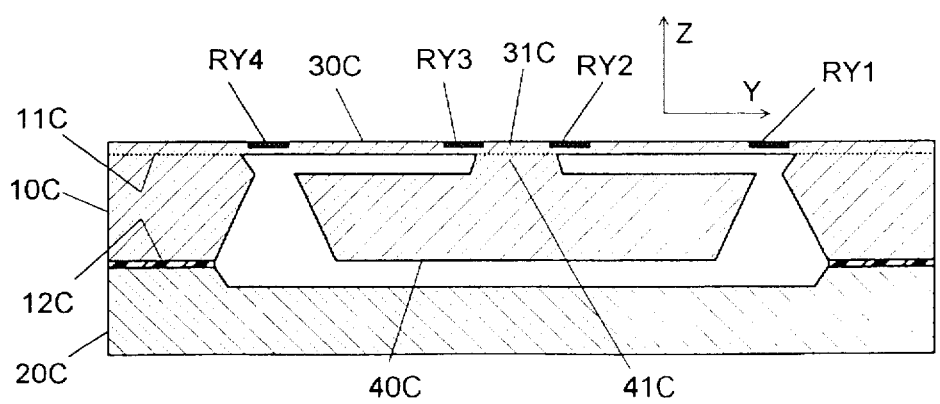
FIG. 22 is a cross-sectional view of the acceleration detector which is taken along line G—G of FIG. 21.
Figure 23:
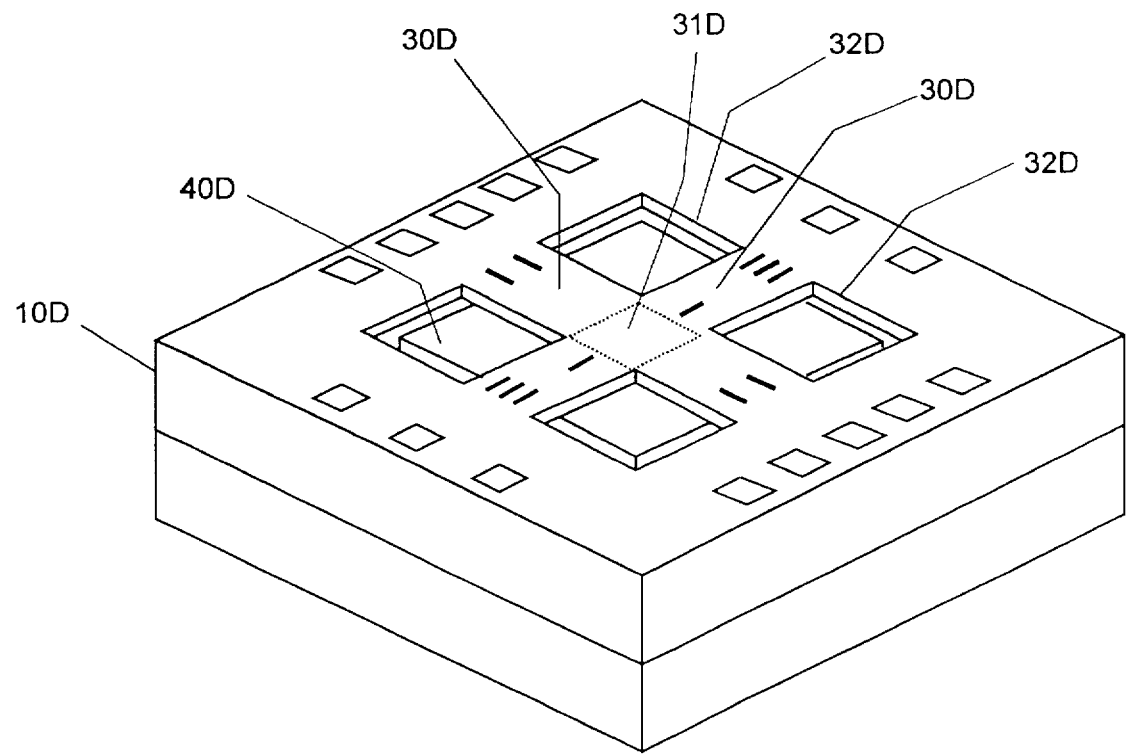
FIG. 23 is a perspective view of a beam-type acceleration detector of the prior art.
Figure 24:
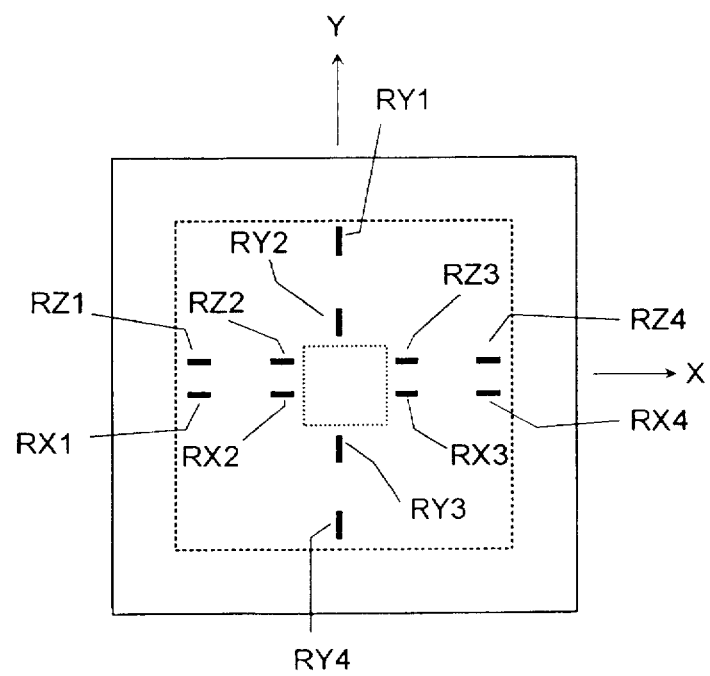
FIG. 24 is a plan view illustrating an arrangement of resistance elements of the acceleration detector of FIG. 21.

By the way, it is preferred that each of the acceleration detectors described in the first to sixth embodiments is designed such that resonance frequencies of the acceleration detector with respect to the X- and Y-axes are equal to the resonance frequency thereof with respect to the Z-axis. Frequency resonances (frx to frz) of an acceleration detector are respectively is generally expressed by the following equations [10] to [12], $$frx = (1/2\pi) \times \{g/(m \times Cx)\}^{1/2} \qquad [10]$$

$$fry = (1/2\pi) \times \{g/(m \times Cy)\}^{1/2} \qquad [11]$$

$$frz = (1/2\pi) \times \{g/(m \times Cz)\}^{1/2} \qquad [12]$$

wherein "g" is gravitational acceleration, "m" is the weight of a weight of the detector and "Cx", "Cy" and "Cz" are compliances with respect to the X-, Y- and Z-axes, respectively. Therefore, when a design of the acceleration detector is determined such that the compliances Cx and Cy are equal to the compliance Cz, a common resonance frequency is obtained with respect to the three axes. For example, in case of a beam-type acceleration detector, it is preferred to design the detector, as shown in FIG. 19. In this case, the resonance frequency of the detector is 3300 Hz. On the other hand, in case of a diaphragm-type acceleration detector, it is preferred to design the detector, as shown in FIG. 20. In this case, the resonance frequency of the detector is 4400 Hz. In FIGS. 19 and 20, a thickness of a resilient member of each detector is 7 μm, and a unit of each size is millimeter (mm). Even if the thickness of the resilient member is varied, the following relation is maintained, that is frx=fry=frz.

Therefore, when the acceleration detector is designed, as shown in FIG. 19 or 20, it is possible to determine a practical frequency zone of the acceleration detector without using an electrical filter for determining the frequency zone.

What is claimed is:

1. An acceleration detector for independently detecting three-dimensional components of acceleration applied thereto with respect to X-, Y- and Z-axes of an orthogonal coordinate system, said acceleration detector comprising:

a frame defining an open space therein and having a top face and a bottom face, said frame being made of a semi-conductor material;

a thin-sheet resilient member made of the same semi-conductor material as said frame to extend in a plane over said open space and integrally joining at a periphery of said resilient member to the top face of said frame, said X- and Y-axes being defined to extend in the plane of said resilient member;

a weight made of the same semi-conductor material as said frame to depend from a center of said resilient member through a neck portion, said neck portion being fixed only with a center portion of said resilient member in such a manner that an elastic deformation of said resilient member will occur when said weight is displaced with respect to said frame by receiving said acceleration, said center portion being defined as a region of said resilient member corresponding to an interface between said resilient member and said neck portion;

a plurality of piezo resistance elements formed in said resilient member, the resistance of which varies in response to strain and elastic deformation of said resilient member, said resistance elements consisting of a first set of four resistance elements for detecting a first component of said acceleration with respect to said X-axis, a second set of four resistance elements for detecting a second component of said acceleration with respect to said Y-axis, and a third set of four resistance elements for detecting a third component of said acceleration with respect to said Z-axis, all of said resistance elements of said first and second sets being located within an inner area of said resilient member immediately adjacent to a circumference of said center portion such that one end of each of the resistance elements of the first and second sets reaches the circumference of said center portion, said inner area being capable of a larger elastic deformation than said outer area of said resilient member adjacent to said frame when said weight is displaced by receiving an acceleration having a horizontal direction parallel to said plane of said resilient member; and acceleration determining means for determining said acceleration in accordance with a variation of electric resistance of said resistance elements.

2. An acceleration detector for independently detecting three-dimensional components of acceleration applied thereto with respect to X-, Y- and Z-axes of an orthogonal coordinate system, said acceleration detector comprising:

a frame defining an open space therein and having a top face and a bottom face, said frame being made of a semi-conductor material;

a thin-sheet resilient member made of the same semi-conductor material as said frame to extend in a plane over said open space and integrally joining at a periphery of said resilient member to the top face of said frame, said X- and Y-axes being defined to extend in the plane of said resilient member;

a weight made of the same semi-conductor material as said frame to depend from a center of said resilient member through a neck portion, said neck portion being fixed only with a center portion of said resilient member in such a manner that an elastic deformation of said resilient member will occur when said weight is displaced with respect to said frame by receiving said acceleration, said center portion being defined as a region of said resilient member corresponding to an interface between said resilient member and said neck portion;

a plurality of piezo resistance elements formed in said resilient member, the resistance of which varies in response to strain and elastic deformation of said resilient member, said resistance elements consisting of a first set of four resistance elements for detecting a first component of said acceleration with respect to said X-axis, a second set of four resistance elements for detecting a second component of said acceleration with respect to said Y-axis, and a third set of four resistance elements for detecting a third component of said acceleration with respect to said Z-axis, all of said resistance elements of said first and second sets being located within an inner area of said resilient member immediately adjacent to a circumference of said center portion so as to be positioned more closely to said center portion than all of said resistance elements of said third set, all of said resistance elements of said third set being located within an outer area of said resilient member adjacent to said frame, said inner area being capable of a larger elastic deformation than said outer area when said weight is displaced by receiving an acceleration having a horizontal direction parallel to said plane of said resilient member; and acceleration determining means for determining said acceleration in accordance with a variation of electric resistance of said resistance elements.

3. An acceleration detector for independently detecting three-dimensional components of acceleration applied thereto with respect to X-, Y- and Z-axes of an orthogonal coordinate system, said acceleration detector comprising:

a frame defining an open space therein and having a top face and a bottom face, said frame being made of a semi-conductor material;

a thin-sheet resilient member made of the same semi-conductor material as said frame to extend in a plane over said open space and integrally joining at a periphery of said resilient member to the top face of said frame, said X- and Y-axes being defined to extend in the plane of said resilient member;

a weight made of the same semi-conductor material as said frame to depend from a center of said resilient member through a neck portion, said neck portion being fixed only with a center portion of said resilient member in such a manner that an elastic deformation of said resilient member will occur when said weight is displaced with respect to said frame by receiving said acceleration said center portion being defined as a region of said resilient member corresponding to an interface between said resilient member and said neck portion;

a plurality of piezo resistance elements formed in said resilient member, the resistance of which varies in response to strain and elastic deformation of said resilient member, said resistance elements consisting of a first set of four resistance elements for detecting a first component of said acceleration with respect to said X-axis, a second set of four resistance elements for detecting a second component of said acceleration with respect to said Y-axis, and a third set of four resistance elements for detecting a third component of said acceleration with respect to said Z-axis;

said four resistance elements of said first set being divided into two first pairs of said resistance elements, said first pairs being arranged on the opposite sides of said center portion with respect to said X-axis and within an inner area of said resilient member immediately adjacent to a circumference of said center portion such that said resistance elements of each of said first pairs are separated from each other by said X-axis, said four resistance elements of said second set being divided into two second pairs of said resistance elements, said second pairs being arranged on the opposite sides of said center portion with respect to said Y-axis and within said inner area such that said resistance elements of each of said second pairs are separated from each other by said Y-axis, said four resistance elements of said third set being respectively arranged within said inner area and between said resistance elements of each of said first and second pairs, said inner area being capable of a larger elastic deformation than an outer area of said resilient member adjacent to said frame when said weight is displaced by receiving an acceleration having a horizontal direction parallel to said plane of said resilient member; and acceleration determining means for determining said acceleration in accordance with a variation of electric resistance of said resistance elements.

4. An acceleration detector for independently detecting three-dimensional components of acceleration applied thereto with respect to X-, Y- and Z-axes of an orthogonal coordinate system, said acceleration detector comprising:

a frame defining an open space therein and having a top face and a bottom face, said frame being made of a semi-conductor material;

a thin-sheet resilient member made of the same semi-conductor material as said frame to extend in a plane over said open space and integrally joining at a periphery of said resilient member to the top face of said frame, said X- and Y-axes being defined to extend in the plane of said resilient member;

a weight made of the same semi-conductor material as said frame to depend from a center of said resilient member through a neck portion, said neck portion being fixed only with a center portion of said resilient member in such a manner that an elastic deformation of said resilient member will occur when said weight is displaced with respect to said frame by receiving said acceleration said center portion being defined as a region of said resilient member corresponding to an interface between said resilient member and said neck portion;

a plurality of piezo resistance elements formed in said resilient member, the resistance of which varies in response to strain and elastic deformation of said resilient member, said resistance elements consisting of a first set of four resistance elements for detecting a first component of said acceleration with respect to said X-axis, a second set of four resistance elements for detecting a second component of said acceleration with respect to said Y-axis, and a third set of four resistance elements for detecting a third component of said acceleration with respect to said Z-axis;

said four resistance elements of said first set being divided into two first pairs of said resistance elements, said first pairs being arranged on the opposite sides of said center portion with respect to said X-axis and within an inner area of said resilient member immediately adjacent to a circumference of said center portion such that said resistance elements of each of said first pairs are separated from each other by said X-axis, said four resistance elements of said second set being divided into two second pairs of said resistance elements, said second pairs being arranged on the opposite sides of said center portion with respect to said Y-axis and within said inner area such that said resistance elements of each of said second pairs are separated from each other by said Y-axis, said four resistance elements of said third set being divided into two third pairs of said resistance elements, said resistance elements of one of said third pairs being arranged on the opposite sides of said center portion with respect to said X-axis and between said resistance elements of each of said first pairs, said resistance elements of the other one of said third pairs being arranged on the opposite sides of said center portion with respect said X-axis and within an outer area of said resilient member adjacent to said frame so that said four resistance elements of said third set are aligned along said X-axis, said inner area being capable of a larger elastic deformation than said outer area when said weight is displaced by receiving an acceleration having a horizontal direction parallel to said plane of said resilient member; and acceleration determining means for determining said acceleration in accordance with a variation of electric resistance of said resistance elements.

5. An acceleration detector for independently detecting three-dimensional components of acceleration applied thereto with respect to X-, Y- and Z-axes of an orthogonal coordinate system, said acceleration detector comprising:

a frame defining an open space therein and having a top face and a bottom face, said frame being made of a semi-conductor material;

a thin-sheet resilient member made of the same semi-conductor material as said frame to extend in a plane over said open space and integrally joining at a periphery of said resilient member to the top face of said frame, said X- and Y-axes being defined to extend in the plane of said resilient member, said resilient member being formed with four rectangular holes around a center portion of said resilient member so as to be shaped into a cross beam configuration;

an upper cover fixed on said top face of said frame in a spaced relation to said resilient member;

a weight made of the same semi-conductor material as said frame to depend from said center portion of said resilient member through a neck portion, said neck portion being fixed only with a center portion of said resilient member in such a manner that an elastic deformation of said resilient member will occur when said weight is displaced with respect to said frame by receiving said acceleration, said center portion being defined as a region of said resilient member corresponding to an interface between said resilient member and said neck portion, said weight being formed integrally with four projections which project respectively into said rectangular holes in said resilient member in such a manner that a top face of each of said projections is flush with a top surface of said resilient member, at least one of said projections carrying an upper electrode which is adapted to apply a voltage difference between said upper electrode and said upper cover to develop an electrostatic force in order to displace said weight with respect to said frame for determination of the acceleration in a self-checking manner;

a plurality of piezo resistance elements formed in said resilient member, the resistance of which varies in response to strain and elastic deformation of said resilient member, said resistance elements consisting of a first set of four resistance elements for detecting a first component of said acceleration with respect to said X-axis, a second set of four resistance elements for detecting a second component of said acceleration with respect to said Y-axis, and a third set of four resistance elements for detecting a third component of said acceleration with respect to said Z-axis, all of said resistance elements of said first and second sets being located within an inner area of said resilient member immediately adjacent to a circumference of said center portion, said inner area being capable of a larger elastic deformation than an outer area of said resilient member adjacent to said frame when said weight is displaced by receiving an acceleration having a horizontal direction parallel to said plane of said resilient member; and acceleration determining means for determining said acceleration in accordance with a variation of electric resistance of said resistance elements.

6. An acceleration detector as set forth in claim 1, wherein said four resistance elements of said third set are formed in said resilient member such that two of said four resistance elements are arranged at opposite positions of said outer area on said X-axis and the other two of said four resistance elements are arranged at opposite positions of said outer area on said Y-axis.

7. An acceleration detector as set forth in claim 1, wherein said four resistance elements of said third set are aligned on one of said X- and Y-axes.

8. An acceleration detector as set forth in claim 1, wherein said four resistance elements of said third set are arranged within said inner area.

9. An acceleration detector as set forth in claim 1, wherein said resilient member is formed with four rectangular holes around said center portion so as to be shaped into a cross beam configuration; and further including:

an upper cover fixed on the top face of said frame in a space relation to said resilient member, said upper cover provided on a bottom surface thereof with at least one upper electrode projecting towards adjacent holes in said resilient member in a facing relation to an upper end of said weight; and said upper electrode being adapted to apply a voltage difference between said upper electrode and said weight to develop an electrostatic force in order to displace said weight with respect to said frame for determination of the acceleration in a self-checking manner.

10. An acceleration detector as set forth in claim 9, further including:

a lower cover fixed on a bottom face of said frame in a spaced relation to said weight; and said lower cover being provided with a lower electrode in facing relation to the bottom face of said weight, said lower electrode being adapted to apply a voltage difference between said lower electrode and said weight to develop an electrostatic force in order to displace said weight with respect to said frame.

11. An acceleration detector as set forth in claim 10, wherein said upper electrode comprises a rectangular plate and two triangular plates which are so arranged as to give a generally triangular configuration to said upper electrode, and said lower electrode is in the form of a triangular configuration, said upper and lower electrodes being horizontally offset such that the resulting two electrostatic forces are cooperative to displace said weight along said X-, Y-, and Z-axes simultaneously.

12. An acceleration detector as set forth in claim 1, wherein said resilient member is formed with four rectangular holes around said center portion so as to be shaped into a cross beam configuration; and further including:

an upper cover fixed on the top face of said frame in a spaced relation to said resilient member, said weight formed integrally with four projections which project respectively into said rectangular holes in said resilient member in such a manner that a top face of each of said projections is flush with a top surface of said resilient member, a corner of each of said projections merging integrally into said center portion of said resilient member by way of a joint portion;

at least one of said projections carrying an upper electrode which is adapted to apply a voltage difference between said upper electrode and said upper cover to develop an electrostatic force in order to displace said weight with respect to said frame for determination of the acceleration in a self-checking manner; and said joint portion forming thereon a conductor leading from said upper electrode to a voltage supply for applying said voltage difference.

13. An acceleration detector as set forth in claim 12, further including:

a lower cover fixed on the bottom face of said frame in a spaced relation to said weight; and said weight being provided on a bottom thereof with a lower electrode, said lower electrode being adapted to apply a voltage difference between said lower electrode and said lower cover to develop an electrostatic force in order to displace said weight with respect to said frame.

14. An acceleration detector as set forth in claim 13, wherein said upper electrode comprises a rectangular plate and two triangular plates which are so arranged as to give a generally triangular configuration to said upper electrode, and said lower electrode is in the form of a triangular configuration, said upper and lower electrodes being horizontally offset such that the resulting two electrostatic forces are cooperative to displace said weight along said X-, Y-, and Z-axes simultaneously.

* * * * *